US012542108B2

(12) United States Patent
Byun et al.

(10) Patent No.: US 12,542,108 B2
(45) Date of Patent: Feb. 3, 2026

(54) EMISSION DRIVER, GATE DRIVER, AND DISPLAY DEVICE

(71) Applicant: Samsung Display Co., Ltd., Yongin-Si (KR)

(72) Inventors: Minwoo Byun, Yongin-si (KR); Minjoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/829,282

(22) Filed: Sep. 10, 2024

(65) Prior Publication Data

US 2025/0104650 A1 Mar. 27, 2025

(30) Foreign Application Priority Data

Sep. 27, 2023 (KR) ........................ 10-2023-0131198

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/08* (2013.01); *G09G 2330/023* (2013.01)

(58) Field of Classification Search
CPC .. G09G 3/3266; G09G 3/3275; G09G 3/3674; G09G 2300/0426; G09G 2310/08; G09G 2310/0267; G09G 2310/0286; G09G 2330/023; G09G 2330/021
See application file for complete search history.

(56) References Cited

U.S. PATENT DOCUMENTS

| | | | | |
|---|---|---|---|---|
| 9,780,157 | B2 | 10/2017 | Kwon et al. | |
| 2021/0366402 | A1* | 11/2021 | In | G09G 3/3266 |
| 2022/0383821 | A1 | 12/2022 | No et al. | |
| 2023/0071094 | A1* | 3/2023 | Son | H10D 86/441 |
| 2023/0105266 | A1* | 4/2023 | Hong | G09G 3/3275 345/212 |

(Continued)

FOREIGN PATENT DOCUMENTS

| | | | |
|---|---|---|---|
| KR | 10-2518387 | B1 | 4/2023 |
| WO | 2012111586 | A1 | 8/2012 |

OTHER PUBLICATIONS

European Search Report corresponding to European Patent Application No. 24201387.8 dated Feb. 25, 2025, 12 pages.

*Primary Examiner* — David Tung
(74) *Attorney, Agent, or Firm* — Innovation Counsel LLP

(57) ABSTRACT

An emission driver is disclosed that includes a plurality of emission stages, and each of the emission stages includes a boosting circuit configured to boost a voltage of a control node. The boosting circuit includes a fifth transistor including a gate electrode connected to the control node, a first electrode, and a second electrode, a 17th transistor including a gate electrode configured to receive a first clock signal, a first electrode configured to receive a second low gate voltage, and a second electrode connected to the first electrode of the fifth transistor, and an 18th transistor including a gate electrode configured to receive a second clock signal having a phase that is different from a phase of the first clock signal, a first electrode configured to receive a high gate voltage, and a second electrode connected to the first electrode of the fifth transistor.

20 Claims, 10 Drawing Sheets

(56) References Cited

U.S. PATENT DOCUMENTS

| | | | | |
|---|---|---|---|---|
| 2023/0177999 | A1 | 6/2023 | Park et al. | |
| 2023/0217759 | A1 * | 7/2023 | Seo .................... | H10K 59/8052 257/40 |

* cited by examiner

EMISSION DRIVER, GATE DRIVER, AND DISPLAY DEVICE

CROSS-REFERENCE TO RELATED APPLICATION(S)

This application claims priority under 35 USC § 119 to Korean Patent Application No. 10-2023-0131198 filed on Sep. 27, 2023, in the Korean Intellectual Property Office (KIPO), the entire disclosure of which is incorporated by reference herein.

BACKGROUND

1. Field

Embodiments relate to a display device. More particularly, embodiments relate to an emission driver, a gate driver, and a display device including the emission driver and the gate driver.

2. Description of the Related Art

A display device may include a display panel including pixels, a gate driver configured to provide gate signals to the pixels, and an emission driver configured to provide emission signals to the pixels. Each of the gate driver and the emission driver may receive a clock signal.

When a load applied to the clock signal is large, power consumption caused by the clock signal may be increased. When the power consumption caused by the clock signal is increased, power consumption of each of the gate driver and the emission driver may be increased.

SUMMARY

Embodiments may provide an emission driver in which power consumption is reduced.

Embodiments may provide a gate driver in which power consumption is reduced.

Embodiments may provide a display device in which power consumption is reduced.

An embodiment of an emission driver may include a plurality of emission stages. Each of the emission stages may include an input circuit configured to transmit an input signal to a control node, an inversion control circuit configured to control a voltage of an inversion control node based on a voltage of the control node, an emission output circuit configured to output a high gate voltage as an emission signal in response to the voltage of the control node, and output a first low gate voltage as the emission signal in response to the voltage of the inversion control node, a carry output circuit configured to output the high gate voltage as an emission carry signal in response to the voltage of the control node, and output a second low gate voltage that is less than the first low gate voltage as the emission carry signal in response to the voltage of the inversion control node, and a boosting circuit configured to boost the voltage of the control node. The boosting circuit may include a fifth transistor including a gate electrode connected to the control node, a first electrode, and a second electrode, a 17th transistor including a gate electrode configured to receive a first clock signal, a first electrode configured to receive the second low gate voltage, and a second electrode connected to the first electrode of the fifth transistor, an 18th transistor including a gate electrode configured to receive a second clock signal having a phase that is different from a phase of the first clock signal, a first electrode configured to receive the high gate voltage, and a second electrode connected to the first electrode of the fifth transistor, and a first capacitor including a first electrode connected to the control node, and a second electrode connected to the second electrode of the fifth transistor.

In an embodiment, each of the first clock signal and the second clock signal may have alternating high and low level voltages, and a difference between the high level voltage and the low level voltage may be less than a difference between the high gate voltage and the second low gate voltage.

In an embodiment, the high level voltage may be less than the high gate voltage.

In an embodiment, all transistors included in each of the emission stages may be N-type transistors.

In an embodiment, the input circuit may include a first transistor including a gate electrode configured to receive the first clock signal, a first electrode configured to receive the input signal, and a second electrode connected to the control node.

In an embodiment, the inversion control circuit may include a fourth transistor including a gate electrode connected to the control node, a first electrode configured to receive the second low gate voltage, and a second electrode connected to the inversion control node.

In an embodiment, the inversion control circuit may further include a seventh transistor including a gate electrode configured to receive the first clock signal, a first electrode configured to receive the high gate voltage, and a second electrode, an eighth transistor including a gate electrode connected to the control node, a first electrode configured to receive the first clock signal, and a second electrode connected to the second electrode of the seventh transistor, a ninth transistor including a gate electrode configured to receive the high gate voltage, a first electrode connected to the second electrode of the seventh transistor, and a second electrode, a 10th transistor including a gate electrode connected to the second electrode of the ninth transistor, a first electrode configured to receive the second clock signal, and a second electrode, an 11th transistor including a gate electrode connected to the second electrode of the 10th transistor, a first electrode configured to receive the high gate voltage, and a second electrode connected to the inversion control node, and a third capacitor including a first electrode connected to the gate electrode of the 10th transistor, and a second electrode connected to the gate electrode of the 11th transistor.

In an embodiment, the emission output circuit may include a 12th transistor including a gate electrode connected to the control node, a first electrode configured to receive the high gate voltage, and a second electrode connected to an emission output node through which the emission signal is output, a 14th transistor including a gate electrode connected to the inversion control node, a first electrode configured to receive the first low gate voltage, and a second electrode connected to the emission output node, a fourth capacitor including a first electrode connected to the control node, and a second electrode connected to the emission output node, and a fifth capacitor including a first electrode connected to the inversion control node, and a second electrode configured to receive the first low gate voltage.

In an embodiment, the carry output circuit may include a sixth transistor including a gate electrode connected to the control node, a first electrode configured to receive the high gate voltage, and a second electrode connected to a carry output node through which the emission carry signal is output, and a 13th transistor including a gate electrode connected to the inversion control node, a first electrode configured to receive the second low gate voltage, and a second electrode connected to the carry output node.

In an embodiment, each of the emission stages may further include a control circuit configured to control the voltage of the control node based on the voltage of the inversion control node.

In an embodiment, the control circuit may include a second transistor including a gate electrode connected to the inversion control node, a first electrode configured to receive the second low gate voltage, and a second electrode connected to the control node.

In an embodiment, the control node may be divided into a first control node and a second control node, and each of the emission stages may further includes a third transistor including a gate electrode configured to receive the high gate voltage, a first electrode connected to the first control node, and a second electrode connected to the second control node.

In an embodiment, each of the emission stages may further include a 16th transistor including a gate electrode configured to receive a reset signal, a first electrode configured to receive the first low gate voltage, and a second electrode connected to the control node.

An embodiment of a gate driver may include a plurality of gate stages. Each of the gate stages may include an input circuit configured to transmit an input signal to a control node, a first inversion control circuit configured to control a voltage of a first inversion control node based on a voltage of the control node, a second inversion control circuit configured to control a voltage of a second inversion control node based on the voltage of the control node, a gate output circuit configured to output a high gate voltage as a gate signal in response to the voltage of the control node, and output a first low gate voltage as the gate signal in response to the voltage of the first inversion control node or the voltage of the second inversion control node, a carry output circuit configured to output the high gate voltage as a gate carry signal in response to the voltage of the control node, and output a second low gate voltage that is less than the first low gate voltage as the gate carry signal in response to the voltage of the first inversion control node or the voltage of the second inversion control node, and a boosting circuit configured to boost the voltage of the control node. The boosting circuit may include a fifth transistor including a gate electrode connected to the control node, a first electrode, and a second electrode, a 24th transistor including a gate electrode configured to receive a first clock signal, a first electrode configured to receive the second low gate voltage, and a second electrode connected to the first electrode of the fifth transistor, a 25th transistor including a gate electrode configured to receive a second clock signal having a phase that is different from a phase of the first clock signal, a first electrode configured to receive the high gate voltage, and a second electrode connected to the first electrode of the fifth transistor, and a first capacitor including a first electrode connected to the control node, and a second electrode connected to the second electrode of the fifth transistor.

In an embodiment, each of the first clock signal and the second clock signal may have alternating high and low level voltages, and a difference between the high level voltage and the low level voltage may be less than a difference between the high gate voltage and the second low gate voltage.

In an embodiment, the high level voltage may be less than the high gate voltage.

In an embodiment, all transistors included in each of the gate stages may be N-type transistors.

In an embodiment, each of the gate stages may further include a control circuit configured to control the voltage of the control node based on the voltage of the first inversion control node or the voltage of the second inversion control node.

An embodiment of a display device may include a display panel including a plurality of pixels, a data driver configured to provide data signals to the pixels, a gate driver including a plurality of gate stages configured to provide gate signals to the pixels, an emission driver including a plurality of emission stages configured to provide emission signals to the pixels, and a controller configured to control the data driver, the gate driver, and the emission driver. Each of the emission stages may include an input circuit configured to transmit an input signal to a control node, an inversion control circuit configured to control a voltage of an inversion control node based on a voltage of the control node, an emission output circuit configured to output a high gate voltage as an emission signal in response to the voltage of the control node, and output a first low gate voltage as the emission signal in response to the voltage of the inversion control node, a carry output circuit configured to output the high gate voltage as an emission carry signal in response to the voltage of the control node, and output a second low gate voltage that is less than the first low gate voltage as the emission carry signal in response to the voltage of the inversion control node, and a boosting circuit configured to boost the voltage of the control node. The boosting circuit of each of the emission stages may include a fifth transistor including a gate electrode connected to the control node, a first electrode, and a second electrode, a 17th transistor including a gate electrode configured to receive a first clock signal, a first electrode configured to receive the second low gate voltage, and a second electrode connected to the first electrode of the fifth transistor, an 18th transistor including a gate electrode configured to receive a second clock signal having a phase that is different from a phase of the first clock signal, a first electrode configured to receive the high gate voltage, and a second electrode connected to the first electrode of the fifth transistor, and a first capacitor including a first electrode connected to the control node, and a second electrode connected to the second electrode of the fifth transistor.

In an embodiment, each of the gate stages may include an input circuit configured to transmit an input signal to a control node, a first inversion control circuit configured to control a voltage of a first inversion control node based on a voltage of the control node, a second inversion control circuit configured to control a voltage of a second inversion control node based on the voltage of the control node, a gate output circuit configured to output the high gate voltage as a gate signal in response to the voltage of the control node, and output the first low gate voltage as the gate signal in response to the voltage of the first inversion control node or the voltage of the second inversion control node, a carry output circuit configured to output the high gate voltage as a gate carry signal in response to the voltage of the control node, and output the second low gate voltage as the gate carry signal in response to the voltage of the first inversion control node or the voltage of the second inversion control node, and a boosting circuit configured to boost the voltage of the control node. The boosting circuit of each of the gate stages may include a fifth transistor including a gate electrode connected to the control node, a first electrode, and a second electrode, a 24th transistor including a gate electrode configured to receive the first clock signal, a first electrode configured to receive the second low gate voltage, and a second electrode connected to the first electrode of the fifth transistor, a 25th transistor including a gate electrode configured to receive the second clock signal, a first electrode configured to receive the high gate voltage, and a second electrode connected to the first electrode of the fifth transistor, and a first capacitor including a first electrode connected to the control node, and a second electrode connected to the second electrode of the fifth transistor.

The boosting circuit of each of the emission stages of the emission driver according to the embodiments may include a transistor of which gate electrode receives a clock signal, so that a load applied to the clock signal may be reduced, and power consumptions of the emission driver may be reduced.

The boosting circuit of each of the gate stages of the gate driver according to the embodiments may include a transistor of which gate electrode receives a clock signal, so that a load applied to the clock signal may be reduced, and power consumptions of the gate driver may be reduced.

The display device according to the embodiments may include the emission driver or the gate driver in which power consumption is reduced, so that power consumptions of the display device may be reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
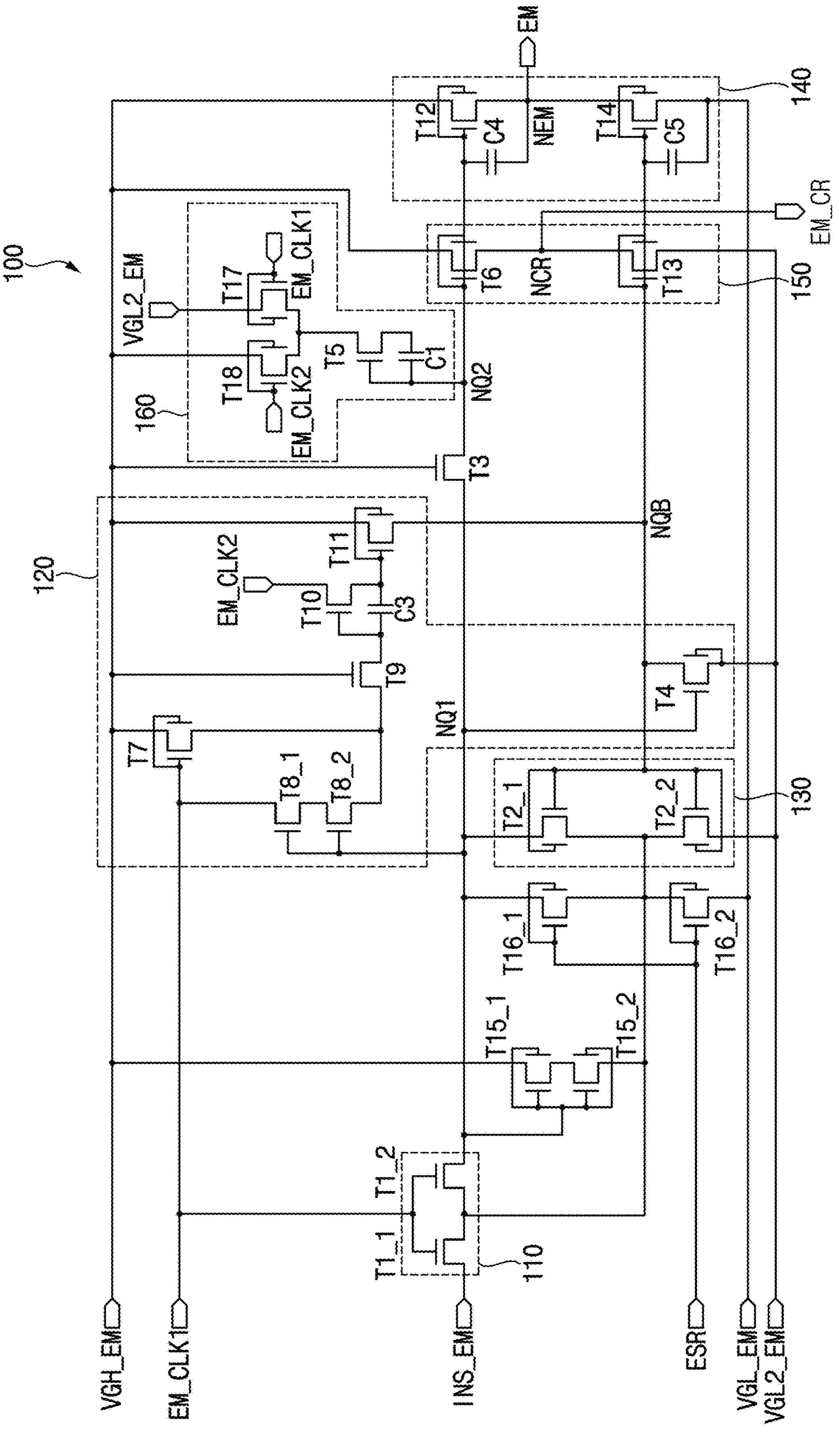
FIG. 1 is a circuit diagram showing an emission stage of an emission driver according to an embodiment.

Hereinafter, an emission driver, a gate driver, and a display device according to embodiments of the present disclosure will be described in more detail with reference to the accompanying drawings. The same or similar reference numerals will be used for the same elements in the accompanying drawings.

FIG. 1 is a circuit diagram showing an emission stage 100 of an emission driver according to an embodiment.

Referring to FIG. 1, an emission driver may include a plurality of emission stages. The emission stage 100 may include an input circuit 110, an inversion control circuit 120, a control circuit 130, an emission output circuit 140, a carry output circuit 150, and a boosting circuit 160.

The input circuit 110 may transmit an input signal INS_EM to a control node NQ1 and NQ2. According to an embodiment, the input circuit 110 of a first emission stage among the emission stages may receive an emission start signal as the input signal INS_EM, and the input circuit 110 of each of the remaining emission stages among the emission stages may receive an emission carry signal of a previous emission stage as the input signal INS_EM. According to an embodiment, the input circuit 110 may include a first transistor T1_1 and T1_2.

The first transistor T1_1 and T1_2 may include a gate electrode configured to receive a first clock signal EM_CLK1, a first electrode configured to receive the input signal INS_EM, and a second electrode connected to the control node NQ1 and NQ2. The first transistor T1_1 and T1_2 may transmit the input signal INS_EM to the control node NQ1 and NQ2 in response to the first clock signal EM_CLK1. According to an embodiment, the first transistor T1_1 and T1_2 may include a first-first transistor T1_1 and a first-second transistor T1_2, which are connected in series and have gate electrodes connected to each other.

The inversion control circuit 120 may control a voltage of an inversion control node NQB based on a voltage of the control node NQ1 and NQ2. According to an embodiment, the inversion control circuit 120 may include a fourth transistor T4.

The fourth transistor T4 may include a gate electrode connected to the control node NQ1 and NQ2, a first electrode configured to receive a second low gate voltage VGL2_EM, and a second electrode connected to the inversion control node NQB. The fourth transistor T4 may transmit the second low gate voltage VGL2_EM to the inversion control node NQB in response to the voltage of the control node NQ1 and NQ2. According to an embodiment, the fourth transistor T4 may further include a back gate electrode configured to receive the second low gate voltage VGL2_EM.

According to an embodiment, the inversion control circuit 120 may further include a seventh transistor T7, an eighth transistor T8_1 and T8_2, a ninth transistor T9, a 10th transistor T10, an 11th transistor T11, and a third capacitor C3. The seventh transistor T7, the eighth transistor T8_1 and T8_2, the ninth transistor T9, the 10th transistor T10, the 11th transistor T11, and the third capacitor C3 may transmit a high gate voltage VGH_EM to the inversion control node NQB in response to the voltage of the control node NQ1 and NQ2.

The seventh transistor T7 may include a gate electrode configured to receive the first clock signal EM_CLK1, a first electrode configured to receive the high gate voltage VGH_EM, and a second electrode. The seventh transistor T7 may transmit the high gate voltage VGH_EM in response to the first clock signal EM_CLK1. According to an embodiment, the seventh transistor T7 may further include a back gate electrode configured to receive the first clock signal EM_CLK1.

The eighth transistor T8_1 and T8_2 may include a gate electrode connected to the control node NQ1 and NQ2, a first electrode configured to receive the first clock signal EM_CLK1, and a second electrode connected to the second electrode of the seventh transistor T7. The eighth transistor T8_1 and T8_2 may transmit the first clock signal EM_CLK1 in response to the voltage of the control node NQ1 and NQ2. According to an embodiment, the eighth transistor T8_1 and T8_2 may include an eighth-first transistor T8_1 and an eighth-second transistor T8_2, which are connected in series and have gate electrodes connected to each other.

The ninth transistor T9 may include a gate electrode configured to receive the high gate voltage VGH_EM, a first electrode connected to the second electrode of the seventh transistor T7, and a second electrode. The ninth transistor T9 may prevent or reduce a boosted voltage of a first electrode of the third capacitor C3 from being transmitted to the seventh transistor T7 and the eighth transistor T8_1 and T8_2. Accordingly, stresses of the seventh transistor T7 and the eighth transistor T8_1 and T8_2 may be alleviated.

The 10th transistor T10 may include a gate electrode connected to the second electrode of the ninth transistor T9, a first electrode configured to receive a second clock signal EM_CLK2, and a second electrode. The 10th transistor T10 may transmit the second clock signal EM_CLK2 in response to a voltage of the first electrode of the third capacitor C3.

The 11th transistor T11 may include a gate electrode connected to the second electrode of the 10th transistor T10, a first electrode configured to receive the high gate voltage VGH_EM, and a second electrode connected to the inversion control node NQB. The 11th transistor T11 may transmit the high gate voltage VGH_EM to the inversion control node NQB in response to a voltage of a second electrode of the third capacitor C3. According to an embodiment, the 11th transistor T11 may further include a back gate electrode connected to the second electrode of the 10th transistor T10.

The third capacitor C3 may include a first electrode connected to the gate electrode of the 10th transistor T10, and a second electrode connected to the gate electrode of the 11th transistor T11. The third capacitor C3 may boost a voltage of the gate electrode of the 10th transistor T10 or a voltage of the gate electrode of the 11th transistor T11. Since the voltage of the gate electrode of the 10th transistor T10 is boosted by the third capacitor C3, the 10th transistor T10 may smoothly transmit the second clock signal EM_CLK2 having a high level voltage. In addition, since the voltage of the gate electrode of the 11th transistor T11 is boosted by the third capacitor C3, the 11th transistor T11 may smoothly transmit the high gate voltage VGH_EM to the inversion control node NQB.

The control circuit 130 may control the voltage of the control node NQ1 and NQ2 based on the voltage of the inversion control node NQB. According to an embodiment, the control circuit 130 may include a second transistor T2_1 and T2_2.

The second transistor T2_1 and T2_2 may include a gate electrode connected to the inversion control node NQB, a first electrode configured to receive the second low gate voltage VGL2_EM, and a second electrode connected to the control node NQ1 and NQ2. The second transistor T2_1 and T2_2 may transmit the second low gate voltage VGL2_EM to the control node NQ1 and NQ2 in response to the voltage of the inversion control node NQB. According to an embodiment, the second transistor T2_1 and T2_2 may include a second-first transistor T2_1 and a second-second transistor T2_2, which are connected in series and have gate electrodes connected to each other. According to an embodiment, the second transistor T2_1 and T2_2 may further include a back gate electrode connected to the inversion control node NQB.

The emission output circuit 140 may output the high gate voltage VGH_EM as an emission signal EM in response to the voltage of the control node NQ1 and NQ2, and output a first low gate voltage VGL_EM as the emission signal EM in response to the voltage of the inversion control node NQB. According to an embodiment, the emission output circuit 140 may include a 12th transistor T12, a 14th transistor T14, a fourth capacitor C4, and a fifth capacitor C5.

The 12th transistor T12 may include a gate electrode connected to the control node NQ1 and NQ2, a first electrode configured to receive the high gate voltage VGH_EM, and a second electrode connected to an emission output node NEM through which the emission signal EM is output. The 12th transistor T12 may transmit the high gate voltage VGH_EM to the emission output node NEM in response to the voltage of the control node NQ1 and NQ2. According to an embodiment, the 12th transistor T12 may further include a back gate electrode connected to the control node NQ1 and NQ2.

The 14th transistor T14 may include a gate electrode connected to the inversion control node NQB, a first electrode configured to receive the first low gate voltage VGL_EM, and a second electrode connected to the emission output node NEM. The 14th transistor T14 may transmit the first low gate voltage VGL_EM to the emission output node NEM in response to the voltage of the inversion control node NQB. According to an embodiment, the 14th transistor T14 may further include a back gate electrode connected to the inversion control node NQB.

The fourth capacitor C4 may include a first electrode connected to the control node NQ1 and NQ2, and a second electrode connected to the emission output node NEM. The fourth capacitor C4 may reduce distortion of a waveform of the emission signal EM.

The fifth capacitor C5 may include a first electrode connected to the inversion control node NQB, and a second electrode configured to receive the first low gate voltage VGL_EM. The fifth capacitor C5 may stabilize the voltage of the inversion control node NQB.

The carry output circuit 150 may output the high gate voltage VGH_EM as an emission carry signal EM_CR in response to the voltage of the control node NQ1 and NQ2, and output the second low gate voltage VGL2_EM as the emission carry signal EM_CR in response to the voltage of the inversion control node NQB. According to an embodiment, the carry output circuit 150 may include a sixth transistor T6 and a 13th transistor T13.

The sixth transistor T6 may include a gate electrode connected to the control node NQ1 and NQ2, a first electrode configured to receive the high gate voltage VGH_EM, and a second electrode connected to a carry output node NCR through which the emission carry signal EM_CR is output. The sixth transistor T6 may transmit the high gate voltage VGH_EM to the carry output node NCR in response to the voltage of the control node NQ1 and NQ2. According to an embodiment, the sixth transistor T6 may further include a back gate electrode connected to the control node NQ1 and NQ2.

The 13th transistor T13 may include a gate electrode connected to the inversion control node NQB, a first electrode configured to receive the second low gate voltage VGL2_EM, and a second electrode connected to the carry output node NCR. The 13th transistor T13 may transmit the second low gate voltage VGL2_EM to the carry output node NCR in response to the voltage of the inversion control node NQB. According to an embodiment, the 13th transistor T13 may further include a back gate electrode connected to the inversion control node NQB.

The boosting circuit 160 may boost the voltage of the control node NQ1 and NQ2. The boosting circuit 160 may include a fifth transistor T5, a 17th transistor T17, an 18th transistor T18, and a first capacitor C1.

The fifth transistor T5 may include a gate electrode connected to the control node NQ1 and NQ2, a first electrode, and a second electrode.

The 17th transistor T17 may include a gate electrode configured to receive the first clock signal EM_CLK1, a first electrode configured to receive the second low gate voltage VGL2_EM, and a second electrode connected to the first electrode of the fifth transistor T5. The 17th transistor T17 may transmit the second low gate voltage VGL2_EM to the first electrode of the fifth transistor T5 in response to the first clock signal EM_CLK1. According to an embodiment, the 17th transistor T17 may further include a back gate electrode configured to receive the first clock signal EM_CLK1.

The 18th transistor T18 may include a gate electrode configured to receive the second clock signal EM_CLK2, a first electrode configured to receive the high gate voltage VGH_EM, and a second electrode connected to the first electrode of the fifth transistor T5. The 18th transistor T18 may transmit the high gate voltage VGH_EM to the first electrode of the fifth transistor T5 in response to the second clock signal EM_CLK2. According to an embodiment, the 18th transistor T18 may further include a back gate electrode configured to receive the second clock signal EM_CLK2.

The first capacitor C1 may include a first electrode connected to the control node NQ1 and NQ2, and a second electrode connected to the second electrode of the fifth transistor T5. The first capacitor C1 may boost the voltage of the control node NQ1 and NQ2. Since the voltage of the control node NQ1 and NQ2 (a voltage of the gate electrode of the 12th transistor T12) is boosted by the first capacitor C1, the 12th transistor T12 may smoothly transmit the high gate voltage VGH_EM to the emission output node NEM. In addition, since the voltage of the control node NQ1 and NQ2 (a voltage of the gate electrode of the sixth transistor T6) is boosted by the first capacitor C1, the sixth transistor T6 may smoothly transmit the high gate voltage VGH_EM to the carry output node NCR.

According to an embodiment, the emission stage 100 may further include a 16th transistor T16_1 and T16_2. The 16th transistor T16_1 and T16_2 may include a gate electrode configured to receive a reset signal ESR, a first electrode configured to receive the first low gate voltage VGL_EM, and a second electrode connected to the control node NQ1 and NQ2. The 16th transistor T16_1 and T16_2 may transmit the first low gate voltage VGL_EM to the control node NQ1 and NQ2 in response to the reset signal ESR. According to an embodiment, the 16th transistor T16_1 and T16_2 may include a 16th-first transistor T16_1 and a 16th-second transistor T16_2, which are connected in series and have gate electrodes connected to each other.

According to an embodiment, the reset signal ESR may be substantially simultaneously applied to a plurality of emission stages when a display device including the emission driver is powered on. The 16th transistors T16_1 and T16_2 of the emission stages may substantially simultaneously reset the control nodes NQ1 and NQ2 of the emission stages to the first low gate voltage VGL_EM in response to the reset signal ESR.

According to an embodiment, the emission stage 100 may further include a 15th transistor T15_1 and T15_2. The 15th transistor T15_1 and T15_2 may include a gate electrode connected to the control node NQ1 and NQ2, a first electrode configured to receive the high gate voltage VGH_EM, and a second electrode connected to a middle node of the first transistor T1_1 and T1_2, a middle node of the second transistor T2_1 and T2_2, and a middle node of the 16th transistor T16_1 and T16_2. The 15th transistor T15_1 and T15_2 may transmit the high gate voltage VGH_EM to the middle node of the first transistor T1_1 and T1_2, the middle node of the second transistor T2_1 and T2_2, and the middle node of the 16th transistor T16_1 and T16_2 in response to the voltage of the control node NQ1 and NQ2. Even when the voltage of the control node NQ1 and NQ2 is boosted, since the 15th transistor T15_1 and T15_2 applies the high gate voltage VGH_EM to the middle node of the first transistor T1_1 and T1_2, the middle node of the second transistor T2_1 and T2_2, and the middle node of the 16th transistor T16_1 and T16_2, the first transistor T1_1 and T1_2, the second transistor T2_1 and T2_2, and the 16th transistor T16_1 and T16_2 may be prevented from deteriorating. According to an embodiment, the 15th transistor T15_1 and T15_2 may include a 15th-first transistor T15_1 and a 15th-second transistor T15_2, which are connected in series and have gate electrodes connected to each other.

According to an embodiment, the control node NQ1 and NQ2 may be divided into a first control node NQ1 and a second control node NQ2, and the emission stage 100 may further include a third transistor T3.

The third transistor T3 may include a gate electrode configured to receive the high gate voltage VGH_EM, a first electrode connected to the first control node NQ1, and a second electrode connected to the second control node NQ2. The third transistor T3 may prevent or reduce a boosted voltage of the second control node NQ2 from being transmitted to the first control node NQ1. Accordingly, stresses of the first transistor T1_1 and T1_2, the second transistor T2_1 and T2_2, the fourth transistor T4, the 15th transistor T15_1 and T15_2, and the 16th transistor T16_1 and T16_2, which are connected to the first control node NQ1, may be alleviated.

According to an embodiment, all transistors T1_1, T1_2, T2_1, T2_2, T3, T4, T5, T6, T7, T8_1, T8_2, T9, T10, T11, T12, T13, T14, T15_1, T15_2, T16_1, T16_2, T17, and T18 included in the emission stage 100 may be N-type transistors (e.g., NMOS transistors) or oxide transistors.

Figure 2:
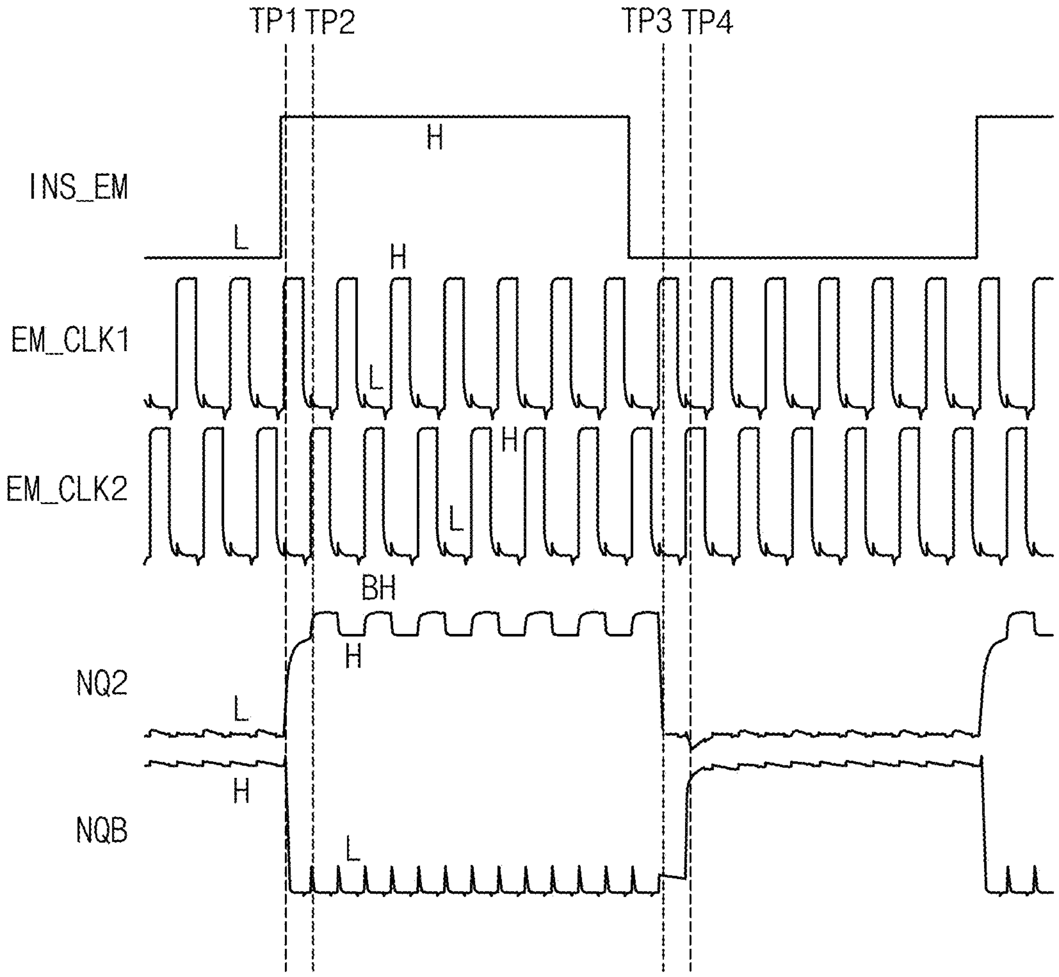
FIG. 2 is a timing diagram for describing an operation of the emission stage of FIG. 1.

FIG. 2 is a timing diagram for describing an operation of the emission stage 100 of FIG. 1.

Referring to FIGS. 1 and 2, the emission stage 100 may receive the input signal INS_EM, the high gate voltage VGH_EM, the first low gate voltage VGL_EM, the second low gate voltage VGL2_EM, the first clock signal EM_CLK1, and the second clock signal EM_CLK2. The high gate voltage VGH_EM may be greater than the first low gate voltage VGL_EM, and the second low gate voltage VGL2_EM may be less than the first low gate voltage VGL_EM. According to an embodiment, the high gate voltage VGH_EM may be about 16 V, the first low gate voltage VGL_EM may be about-3 V, and the second low gate voltage VGL2_EM may be about-6 V.

The first clock signal EM_CLK1 and the second clock signal EM_CLK2 may have mutually different phases (e.g., opposite phases). Each of the first clock signal EM_CLK1 and the second clock signal EM_CLK2 may have alternating high and low level voltages H and L. According to an embodiment, the high level voltage H may be equal to the high gate voltage VGH_EM, and the low level voltage L may be equal to the second low gate voltage VGL2_EM.

At a first time point TP1, the input signal INS_EM may have the high level voltage H, the first clock signal EM_CLK1 may be changed to the high level voltage H, and the second clock signal EM_CLK2 may be changed to the low level voltage L. The first transistor T1_1 and T1_2 and the 17th transistor T17 may be turned on in response to the first clock signal EM_CLK1. The first transistor T1_1 and T1_2 may transmit the input signal INS_EM having the high level voltage H to the first control node NQ1, and the first control node NQ1 may have the high level voltage H. The fourth transistor T4 may be turned on in response to the high level voltage H. The fourth transistor T4 may transmit the second low gate voltage VGL2_EM to the inversion control node NQB, and the inversion control node NQB may have the low level voltage L. The third transistor T3 may be turned on in response to the high gate voltage VGH_EM. The third transistor T3 may transmit the high level voltage H to the second control node NQ2, and the fifth transistor T5 may be turned on in response to the high level voltage H. The 17th transistor T17 may transmit the second low gate voltage VGL2_EM to the first electrode of the fifth transistor T5, and the first electrode of the fifth transistor T5 may have the low level voltage L. The fifth transistor T5 may transmit the low level voltage L to the second electrode of the first capacitor C1.

At a second time point TP2, the input signal INS_EM may have the high level voltage H, the first clock signal EM_CLK1 may be changed to the low level voltage L, and the second clock signal EM_CLK2 may be changed to the high level voltage H. The 18th transistor T18 may be turned on in response to the second clock signal EM_CLK2. The 18th transistor T18 may transmit the high gate voltage VGH_EM to the first electrode of the fifth transistor T5, and the first electrode of the fifth transistor T5 may have the high level voltage H. The fifth transistor T5 may transmit the high level voltage H to the second electrode of the first capacitor C1. A voltage of the first electrode of the first capacitor C1 may be boosted by a coupling effect of the first capacitor C1, and the second control node NQ2 may have a boosted high level voltage BH.

At a third time point TP3, the input signal INS_EM may have the low level voltage L, the first clock signal EM_CLK1 may be changed to the high level voltage H, and the second clock signal EM_CLK2 may be changed to the low level voltage L. The first transistor T1_1 and T1_2 and the seventh transistor T7 may be turned on in response to the first clock signal EM_CLK1. The first transistor T1_1 and T1_2 may transmit the input signal INS_EM having the low level voltage L to the first control node NQ1, and the first control node NQ1 may have the low level voltage L. The third transistor T3 and the ninth transistor T9 may be turned on in response to the high gate voltage VGH_EM. The third transistor T3 may transmit the low level voltage L to the second control node NQ2. The seventh transistor T7 may transmit the high gate voltage VGH_EM to the first electrode of the ninth transistor T9, and the first electrode of the ninth transistor T9 may have the high level voltage H. The ninth transistor T9 may transmit the high level voltage H to the gate electrode of the 10th transistor T10. The 10th transistor T10 may be turned on in response to the high level voltage. The 10th transistor T10 may transmit the second clock signal EM_CLK2 having the low level voltage L to the gate electrode of the 11th transistor T11, and the gate electrode of the 11th transistor T11 may have the low level voltage L.

At a fourth time point TP4, the input signal INS_EM may have the low level voltage L, the first clock signal EM_CLK1 may be changed to the low level voltage L, and the second clock signal EM_CLK2 may be changed to the high level voltage H. The 10th transistor T10 may transmit the second clock signal EM_CLK2 having the high level voltage H to the gate electrode of the 11th transistor T11, and the gate electrode of the 11th transistor T11 may have the high level voltage H. The 11th transistor T11 may be turned on in response to the high level voltage H. The 11th transistor T11 may transmit the high gate voltage VGH_EM to the inversion control node NQB, and the inversion control node NQB may have the high level voltage H.

Figure 3:
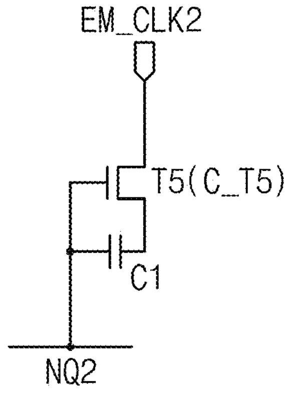
FIG. 3 is a circuit diagram showing a boosting circuit of an emission stage according to a comparative example.

FIG. 3 is a circuit diagram showing a boosting circuit of an emission stage according to a comparative example.

Referring to FIG. 3, a boosting circuit of an emission stage according to a comparative example may include only a fifth transistor T5 and a first capacitor C1, and a first electrode of the fifth transistor T5 may receive a second clock signal EM_CLK2. A load applied to the second clock signal EM_CLK2 may be calculated as a capacitance of an equivalent capacitor viewed from the second clock signal EM_CLK2. When the fifth transistor T5 is turned on, the capacitance CPE1 of the equivalent capacitor viewed from the second clock signal EM_CLK2 may be calculated by Mathematical Formula 1.

$$CPE1 = CP1 + CP\_T5 \qquad \text{[Mathematical Formula 1]}$$

In Mathematical Formula 1, CP1 is a capacitance of a first capacitor C1, and CP_T5 is a capacitance of a channel capacitor C_T5 of a fifth transistor T5. Since the first capacitor C1 and the channel capacitor C_T5 of the fifth transistor T5 are connected in parallel, the capacitance CPE1 of the equivalent capacitor viewed from the second clock signal EM_CLK2 may be large, and the load applied to the second clock signal EM_CLK2 may be large. Since the load applied to the second clock signal EM_CLK2 is large, power consumption caused by the second clock signal EM_CLK2 may be large, and power consumption of the emission stage according to the comparative example may be large.

Figure 4:
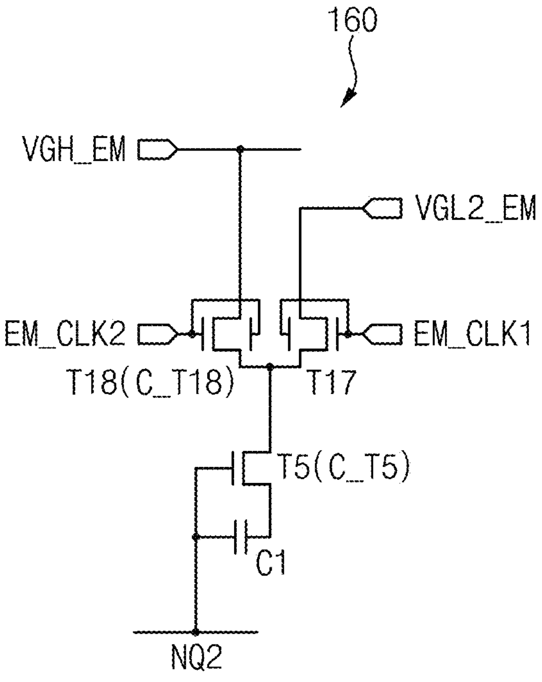
FIG. 4 is a circuit diagram showing a boosting circuit of the emission stage according to an embodiment.

FIG. 4 is a circuit diagram showing a boosting circuit 160 of the emission stage 100 according to an embodiment.

Referring to FIG. 4, the boosting circuit 160 of the emission stage 100 according to an embodiment may include a fifth transistor T5, a 17th transistor T17, an 18th transistor T18, and a first capacitor C1, the gate electrode of the 17th transistor T17 may receive the first clock signal EM_CLK1, and the gate electrode of the 18th transistor T18 may receive the second clock signal EM_CLK2. When the fifth transistor T5 is turned on, a capacitance CPE2 of an equivalent capacitor viewed from the second clock signal EM_CLK2 may be calculated by Mathematical Formula 2.

$$\frac{1}{CPE2} = \frac{1}{CP1 + CP\_T5} + \frac{1}{CP\_T18} \qquad \text{[Mathematical Formula 2]}$$

In Mathematical Formula 2, CP1 is a capacitance of a first capacitor C1, CP_T5 is a capacitance of a channel capacitor C_T5 of a fifth transistor T5, and CP_T18 is a capacitance of a channel capacitor C_T18 of an 18th transistor T18. Since the channel capacitor C_T18 of the 18th transistor T18 is connected in series to the first capacitor C1 and the channel capacitor C_T5 of the fifth transistor T5, which are connected in parallel, the capacitance CPE2 of the equivalent capacitor viewed from the second clock signal EM_CLK2 may be small, and a load applied the second clock signal EM_CLK2 may be small. Since the load applied to the second clock signal EM_CLK2 is small, power consumption caused by the second clock signal EM_CLK2 may be small, and power consumption of the emission stage 100 according to an embodiment may be small.

According to an embodiment, a difference between the high level voltage H and the low level voltage L of each of the first and second clock signals EM_CLK1 and EM_CLK2 may be less than a difference between the high gate voltage VGH_EM and the second low gate voltage VGL2_EM. Power consumption caused by the first and second clock signals EM_CLK1 and EM_CLK2 may be proportional to the square of the difference between the high level voltage H and the low level voltage L. Since the difference between the high level voltage H and the low level voltage L of each of the first and second clock signals EM_CLK1 and EM_CLK2 is less than the difference between the high gate voltage VGH_EM and the second low gate voltage VGL2_EM, the power consumption caused by the first and second clock signals EM_CLK1 and EM_CLK2 may be reduced. Accordingly, the power consumption of the emission stage 100 may be reduced.

According to an embodiment, the high level voltage H of each of the first and second clock signals EM_CLK1 and EM_CLK2 may be less than the high gate voltage VGH_EM. For example, the high level voltage H of each of the first and second clock signals EM_CLK1 and EM_CLK2 may be about 13 V.

Figure 5:
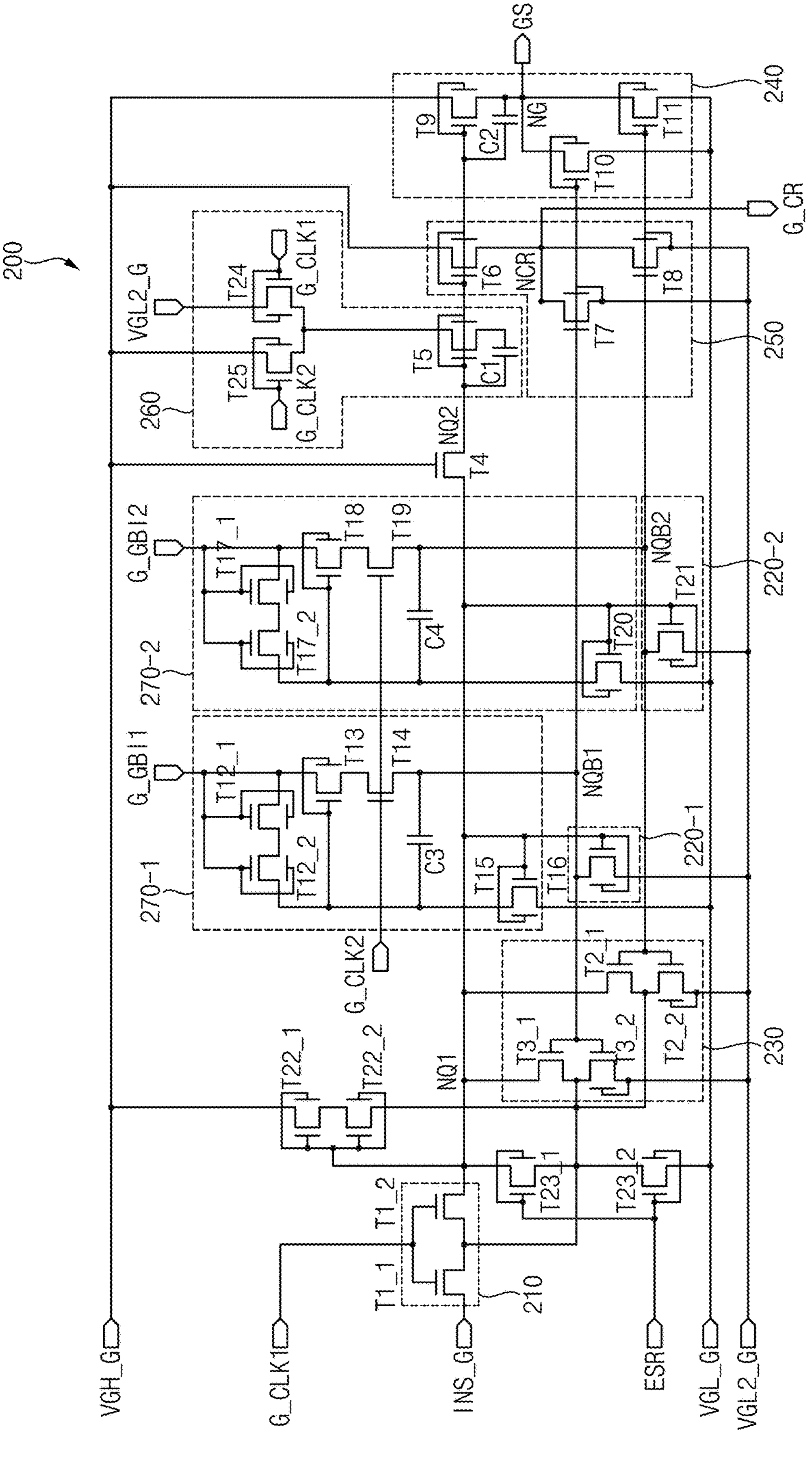
FIG. 5 is a circuit diagram showing a gate stage of a gate driver according to an embodiment.

FIG. 5 is a circuit diagram showing a gate stage 200 of a gate driver according to an embodiment.

Referring to FIG. 5, a gate driver may include a plurality of gate stages. The gate stage 200 may include an input circuit 210, a first inversion control circuit 220-1, a second inversion control circuit 220-2, a control circuit 230, a gate output circuit 240, a carry output circuit 250, a boosting circuit 260, a first selection circuit 270-1, and a second selection circuit 270-2.

The input circuit 210 may transmit an input signal INS_G to a control node NQ1 and NQ2. According to an embodiment, the input circuit 210 of a first gate stage among the gate stages may receive a gate start signal as the input signal INS_G, and the input circuit 210 of each of the remaining gate stages among the gate stages may receive a gate carry signal of a previous gate stage as the input signal INS_G. According to an embodiment, the input circuit 210 may include a first transistor T1_1 and T1_2.

The first transistor T1_1 and T1_2 may include a gate electrode configured to receive a first clock signal G_CLK1, a first electrode configured to receive the input signal INS_G, and a second electrode connected to the control node NQ1 and NQ2. The first transistor T1_1 and T1_2 may transmit the input signal INS_G to the control node NQ1 and NQ2 in response to the first clock signal G_CLK1. According to an embodiment, the first transistor T1_1 and T1_2 may include a first-first transistor T1_1 and a first-second transistor T1_2, which are connected in series and have gate electrodes connected to each other.

The first inversion control circuit 220-1 may control a voltage of a first inversion control node NQB1 based on a voltage of the control node NQ1 and NQ2. According to an embodiment, the first inversion control circuit 220-1 may include a 16th transistor T16.

The 16th transistor T16 may include a gate electrode connected to the control node NQ1 and NQ2, a first electrode configured to receive a second low gate voltage VGL2_G, and a second electrode connected to the first inversion control node NQB1. The 16th transistor T16 may transmit the second low gate voltage VGL2_G to the first inversion control node NQB1 in response to the voltage of the control node NQ1 and NQ2. According to an embodiment, the 16th transistor T16 may further include a back gate electrode connected to the control node NQ1 and NQ2.

The second inversion control circuit 220-2 may control a voltage of a second inversion control node NQB2 based on the voltage of the control node NQ1 and NQ2. According to an embodiment, the second inversion control circuit 220-2 may include a 21st transistor T21.

The 21st transistor T21 may include a gate electrode connected to the control node NQ1 and NQ2, a first electrode configured to receive the second low gate voltage VGL2_G, and a second electrode connected to the second inversion control node NQB2. The 21st transistor T21 may transmit the second low gate voltage VGL2_G to the second inversion control node NQB2 in response to the voltage of the control node NQ1 and NQ2. According to an embodiment, the 21st transistor T21 may further include a back gate electrode connected to the control node NQ1 and NQ2.

The control circuit 230 may control the voltage of the control node NQ1 and NQ2 based on the voltage of the first inversion control node NQB1 or the voltage of the second inversion control node NQB2. According to an embodiment, the control circuit 230 may include a second transistor T2_1 and T2_2 and a third transistor T3_1 and T3_2.

The second transistor T2_1 and T2_2 may include a gate electrode connected to the second inversion control node NQB2, a first electrode configured to receive the second low gate voltage VGL2_G, and a second electrode connected to the control node NQ1 and NQ2. The second transistor T2_1 and T2_2 may transmit the second low gate voltage VGL2_G to the control node NQ1 and NQ2 in response to the voltage of the second inversion control node NQB2. According to an embodiment, the second transistor T2_1 and T2_2 may include a second-first transistor T2_1 and a second-second transistor T2_2, which are connected in series and have gate electrodes connected to each other. According to an embodiment, the second-second transistor T2_2 may further include a back gate electrode configured to receive the second low gate voltage VGL2_G.

The third transistor T3_1 and T3_2 may include a gate electrode connected to the first inversion control node NQB1, a first electrode configured to receive the second low gate voltage VGL2_G, and a second electrode connected to the control node NQ1 and NQ2. The third transistor T3_1 and T3_2 may transmit the second low gate voltage VGL2_G to the control node NQ1 and NQ2 in response to the voltage of the first inversion control node NQB1. According to an embodiment, the third transistor T3_1 and T3_2 may include a third-first transistor T3_1 and a third-second transistor T3_2, which are connected in series and have gate electrodes connected to each other. According to an embodiment, the third-second transistor T3_2 may further include a back gate electrode configured to receive the second low gate voltage VGL2_G.

The gate output circuit 240 may output a high gate voltage VGH_G as a gate signal GS in response to the voltage of the control node NQ1 and NQ2, and output a first low gate voltage VGL_G as the gate signal GS in response to the voltage of the first inversion control node NQB1 or the voltage of the second inversion control node NQB2. According to an embodiment, the gate output circuit 240 may include a ninth transistor T9, a 10th transistor T10, an 11th transistor T11, and a second capacitor C2.

The ninth transistor T9 may include a gate electrode connected to the control node NQ1 and NQ2, a first electrode configured to receive the high gate voltage VGH_G, and a second electrode connected to a gate output node NG through which the gate signal GS is output. The ninth transistor T9 may transmit the high gate voltage VGH_G to the gate output node NG in response to the voltage of the control node NQ1 and NQ2. According to an embodiment, the ninth transistor T9 may further include a back gate electrode connected to the control node NQ1 and NQ2.

The 10th transistor T10 may include a gate electrode connected to the first inversion control node NQB1, a first electrode configured to receive the first low gate voltage VGL_G, and a second electrode connected to the gate output node NG. The 10th transistor T10 may transmit the first low gate voltage VGL_G to the gate output node NG in response to the voltage of the first inversion control node NQB1. According to an embodiment, the 10th transistor T10 may further include a back gate electrode connected to the first inversion control node NQB1.

The 11th transistor T11 may include a gate electrode connected to the second inversion control node NQB2, a first electrode configured to receive the first low gate voltage VGL_G, and a second electrode connected to the gate output node NG. The 11th transistor T11 may transmit the first low gate voltage VGL_G to the gate output node NG in response to the voltage of the second inversion control node NQB2. According to an embodiment, the 11th transistor T11 may further include a back gate electrode connected to the second inversion control node NQB2.

The second capacitor C2 may include a first electrode connected to the control node NQ1 and NQ2, and a second electrode connected to the gate output node NG. The second capacitor C2 may reduce distortion of a waveform of the gate signal GS.

The carry output circuit 250 may output the high gate voltage VGH_G as a gate carry signal G_CR in response to the voltage of the control node NQ1 and NQ2, and output the second low gate voltage VGL2_G as the gate carry signal G_CR in response to the voltage of the first inversion control node NQB1 or the voltage of the second inversion control node NQB2. According to an embodiment, the carry output circuit 250 may include a sixth transistor T6, a seventh transistor T7, and an eighth transistor T8.

The sixth transistor T6 may include a gate electrode connected to the control node NQ1 and NQ2, a first electrode configured to receive the high gate voltage VGH_G, and a second electrode connected to a carry output node NCR through which the gate carry signal G_CR is output. The sixth transistor T6 may transmit the high gate voltage VGH_G to the carry output node NCR in response to the voltage of the control node NQ1 and NQ2. According to an embodiment, the sixth transistor T6 may further include a back gate electrode connected to the control node NQ1 and NQ2.

The seventh transistor T7 may include a gate electrode connected to the first inversion control node NQB1, a first electrode configured to receive the second low gate voltage VGL2_G, and a second electrode connected to the carry output node NCR. The seventh transistor T7 may transmit the second low gate voltage VGL2_G to the carry output node NCR in response to the voltage of the first inversion control node NQB1. According to an embodiment, the seventh transistor T7 may further include a back gate electrode configured to receive the second low gate voltage VGL2_G.

The eighth transistor T8 may include a gate electrode connected to the second inversion control node NQB2, a first electrode configured to receive the second low gate voltage VGL2_G, and a second electrode connected to the carry output node NCR. The eighth transistor T8 may transmit the second low gate voltage VGL2_G to the carry output node NCR in response to the voltage of the second inversion control node NQB2. According to an embodiment, the eighth transistor T8 may further include a back gate electrode configured to receive the second low gate voltage VGL2_G.

The boosting circuit 260 may boost the voltage of the control node NQ1 and NQ2. The boosting circuit 260 may include a fifth transistor T5, a 24th transistor T24, a 25th transistor T25, and a first capacitor C1.

The fifth transistor T5 may include a gate electrode connected to the control node NQ1 and NQ2, a first electrode, and a second electrode.

The 24th transistor T24 may include a gate electrode configured to receive the first clock signal G_CLK1, a first electrode configured to receive the second low gate voltage VGL2_G, and a second electrode connected to the first electrode of the fifth transistor T5. The 24th transistor T24 may transmit the second low gate voltage VGL2_G to the first electrode of the fifth transistor T5 in response to the first clock signal G_CLK1. According to an embodiment, the 24th transistor T24 may further include a back gate electrode configured to receive the first clock signal G_CLK1.

The 25th transistor T25 may include a gate electrode configured to receive a second clock signal G_CLK2, a first electrode configured to receive the high gate voltage VGH_G, and a second electrode connected to the first electrode of the fifth transistor T5. The 25th transistor T25 may transmit the high gate voltage VGH_G to the first electrode of the fifth transistor T5 in response to the second clock signal G_CLK2. According to an embodiment, the 25th transistor T25 may further include a back gate electrode configured to receive the second clock signal G_CLK2.

The first capacitor C1 may include a first electrode connected to the control node NQ1 and NQ2, and a second electrode connected to the second electrode of the fifth transistor T5. The first capacitor C1 may boost the voltage of the control node NQ1 and NQ2. Since the voltage of the control node NQ1 and NQ2 (a voltage of the gate electrode of the ninth transistor T9) is boosted by the first capacitor C1, the ninth transistor T9 may smoothly transmit the high gate voltage VGH_G to the gate output node NG. In addition, since the voltage of the control node NQ1 and NQ2 (a voltage of the gate electrode of the sixth transistor T6) is boosted by the first capacitor C1, the sixth transistor T6 may smoothly transmit the high gate voltage VGH_G to the carry output node NCR.

The first selection circuit 270-1 may activate the seventh transistor T7 and the 10th transistor T10 and inactivate the eighth transistor T8 and the 11th transistor T11 based on a first selection signal G_GBI1. According to an embodiment, the first selection circuit 270-1 may include a 12th transistor T12_1 and T12_2, a 13th transistor T13, a 14th transistor T14, a 15th transistor T15, and a third capacitor C3.

The 12th transistor T12_1 and T12_2 may include a gate electrode configured to receive the first selection signal G_GBI1, a first electrode configured to receive the first selection signal G_GBI1, and a second electrode. According to an embodiment, the 12th transistor T12_1 and T12_2 may include a 12th-first transistor T12_1 and a 12th-second transistor T12_2, which are connected in series and have gate electrodes connected to each other. The 13th transistor T13 may include a gate electrode connected to the second electrode of the 12th transistor T12_1 and T12_2, a first electrode configured to receive the first selection signal G_GBI1, and a second electrode. The 14th transistor T14 may include a gate electrode configured to receive the second clock signal G_CLK2, a first electrode connected to the second electrode of the 13th transistor T13, and a second electrode connected to the first inversion control node NQB1. The 15th transistor T15 may include a gate electrode connected to the control node NQ1 and NQ2, a first electrode configured to receive the first low gate voltage VGL_G, and a second electrode connected to the gate electrode of the 13th transistor T13. The third capacitor C3 may include a first electrode connected to the gate electrode of the 13th transistor T13, and a second electrode connected to the first inversion control node NQB1. The third capacitor C3 may quicken turn-on and turn-off of the 13th transistor T13.

The second selection circuit 270-2 may activate the eighth transistor T8 and the 11th transistor T11 and inactivate the seventh transistor T7 and the 10th transistor T10 based on a second selection signal G_GBI2. According to an embodiment, the second selection circuit 270-2 may include a 17th transistor T17_1 and T17_2, an 18th transistor T18, a 19th transistor T19, a 20th transistor T20, and a fourth capacitor C4.

The 17th transistor T17_1 and T17_2 may include a gate electrode configured to receive the second selection signal G_GBI2, a first electrode configured to receive the second selection signal G_GBI2, and a second electrode. According to an embodiment, the 17th transistor T17_1 and T17_2 may include a 17th-first transistor T17_1 and a 17th-second transistor T17_2, which are connected in series and have gate electrodes connected to each other. The 18th transistor T18 may include a gate electrode connected to the second electrode of the 17th transistor T17_1 and T17_2, a first electrode configured to receive the second selection signal G_GBI2, and a second electrode. The 19th transistor T19 may include a gate electrode configured to receive the second clock signal G_CLK2, a first electrode connected to the second electrode of the 18th transistor T18, and a second electrode connected to the second inversion control node NQB2. The 20th transistor T20 may include a gate electrode connected to the control node NQ1 and NQ2, a first electrode configured to receive the first low gate voltage VGL_G, and a second electrode connected to the gate electrode of the 18th transistor T18. The fourth capacitor C4 may include a first electrode connected to the gate electrode of the 18th transistor T18, and a second electrode connected to the second inversion control node NQB2. The fourth capacitor C4 may quicken turn-on and turn-off of the 18th transistor T18.

The first selection signal G_GBI1 and the second selection signal G_GBI2 may have mutually different phases (e.g., opposite phases). Each of the first selection signal G_GBI1 and the second selection signal G_GBI2 may have alternating high and low level voltages. According to an embodiment, in a first frame period, the first selection signal G_GBI1 and the second selection signal G_GBI2 may have the high level voltage and the low level voltage, respectively, so that the seventh transistor T7 and the 10th transistor T10 may operate. In addition, in a second frame period after the first frame period, the first selection signal G_GBI1 and the second selection signal G_GBI2 may have the low level voltage and the high level voltage, respectively, so that the eighth transistor T8 and the 11th transistor T11 may operate.

According to an embodiment, the gate stage 200 may further include a 23rd transistor T23_1 and T23_2. The 23rd transistor T23_1 and T23_2 may include a gate electrode configured to receive a reset signal ESR, a first electrode configured to receive the first low gate voltage VGL_G, and a second electrode connected to the control node NQ1 and NQ2. The 23rd transistor T23_1 and T23_2 may transmit the first low gate voltage VGL_G to the control node NQ1 and NQ2 in response to the reset signal ESR. According to an embodiment, the 23rd transistor T23_1 and T23_2 may include a 23rd-first transistor T23_1 and a 23rd-second transistor T23_2, which are connected in series and have gate electrodes connected to each other.

According to an embodiment, the reset signal ESR may be substantially simultaneously applied to a plurality of gate stages when a display device including the gate driver is powered on. The 23rd transistors T23_1 and T23_2 of the gate stages may substantially simultaneously reset the control nodes NQ1 and NQ2 of the gate stages to the first low gate voltage VGL_G in response to the reset signal ESR.

According to an embodiment, the gate stage 200 may further include a 22nd22nd transistor T22_1 and T22_2. The 22nd transistor T22_1 and T22_2 may include a gate electrode connected to the control node NQ1 and NQ2, a first electrode configured to receive the high gate voltage VGH_G, and a second electrode connected to a middle node of the first transistor T1_1 and T1_2, a middle node of the second transistor T2_1 and T2_2, a middle node of the third transistor T3_1 and T3_2, and a middle node of the 23rd23rd transistor T23_1 and T23_2. The 22nd transistor T22_1 and T22_2 may transmit the high gate voltage VGH_G to the middle node of the first transistor T1_1 and T1_2, the middle node of the second transistor T2_1 and T2_2, the middle node of the third transistor T3_1 and T3_2, and the middle node of the 23rd transistor T23_1 and T23_2 in response to the voltage of the control node NQ1 and NQ2. Even when the voltage of the control node NQ1 and NQ2 is boosted, since the 22nd transistor T22_1 and T22_2 applies the high gate voltage VGH_G to the middle node of the first transistor T1_1 and T1_2, the middle node of the second transistor T2_1 and T2_2, the middle node of the third transistor T3_1 and T3_2, and the middle node of the 23rd transistor T23_1 and T23_2, the first transistor T1_1 and T1_2, the second transistor T2_1 and T2_2, the third transistor, and the 23rd transistor T23_1 and T23_2 may be prevented from deteriorating. According to an embodiment, the 22nd transistor T22_1 and T22_2 may include a 22nd-first transistor T22_1 and a 22nd-second transistor T22_2, which are connected in series and have gate electrodes connected to each other.

According to an embodiment, the control node NQ1 and NQ2 may be divided into a first control node NQ1 and a second control node NQ2, and the gate stage 200 may further include a fourth transistor T4.

The fourth transistor T4 may include a gate electrode configured to receive the high gate voltage VGH_G, a first electrode connected to the first control node NQ1, and a second electrode connected to the second control node NQ2. The fourth transistor T4 may prevent or reduce a boosted voltage of the second control node NQ2 from being transmitted to the first control node NQ1. Accordingly, stresses of the first transistor T1_1 and T1_2, the second transistor T2_1 and T2_2, the third transistor T3_1 and T3_2, the 15th transistor T15, the 16th transistor T16, the 20th transistor T20, the 21st21st transistor T21, the 22nd transistor T22_1 and T22_2, and the 23rd transistor T23_1 and T23_2, which are connected to the first control node NQ1, may be alleviated.

According to an embodiment, all transistors T1_1, T1_2, T2_1, T2_2, T3_1, T3_2, T4, T5, T6, T7, T8, T9, T10, T11, T12_1, T12_2, T13, T14, T15, T16, T17_1, T17_2, T18, T19, T20, T21, T22_1, T22_2, T23_1, T23_2, T24, and T25 included in the gate stage 200 may be N-type transistors (e.g., NMOS transistors) or oxide transistors.

The gate stage 200 may receive the input signal INS_G, the high gate voltage VGH_G, the first low gate voltage VGL_G, the second low gate voltage VGL2_G, the first clock signal G_CLK1, and the second clock signal G_CLK2. The high gate voltage VGH_G may be greater than the first low gate voltage VGL_G, and the second low gate voltage VGL2_G may be less than the first low gate voltage VGL_G. According to an embodiment, the high gate voltage VGH_G may be about 16 V, the first low gate voltage VGL_G may be about-3 V, and the second low gate voltage VGL2_G may be about-6 V.

The first clock signal G_CLK1 and the second clock signal G_CLK2 may have mutually different phases (e.g., opposite phases). Each of the first clock signal G_CLK1 and the second clock signal G_CLK2 may have alternating high and low level voltages. According to an embodiment, the high level voltage may be equal to the high gate voltage VGH_G, and the low level voltage may be equal to the second low gate voltage VGL2_G.

According to an embodiment, a difference between the high level voltage and the low level voltage of each of the first and second clock signals G_CLK1 and G_CLK2 may be less than a difference between the high gate voltage VGH_G and the second low gate voltage VGL2_G. Power consumption caused by the first and second clock signals G_CLK1 and G_CLK2 may be proportional to the square of the difference between the high level voltage and the low level voltage. Since the difference between the high level voltage and the low level voltage of each of the first and second clock signals G_CLK1 and G_CLK2 is less than the difference between the high gate voltage VGH_G and the second low gate voltage VGL2_G, the power consumption caused by the first and second clock signals G_CLK1 and G_CLK2 may be reduced. Accordingly, power consumption of the gate stage 200 may be reduced.

According to an embodiment, the high level voltage of each of the first and second clock signals G_CLK1 and G_CLK2 may be less than the high gate voltage VGH_G. For example, the high level voltage of each of the first and second clock signals G_CLK1 and G_CLK2 may be about 13 V.

Figure 6:
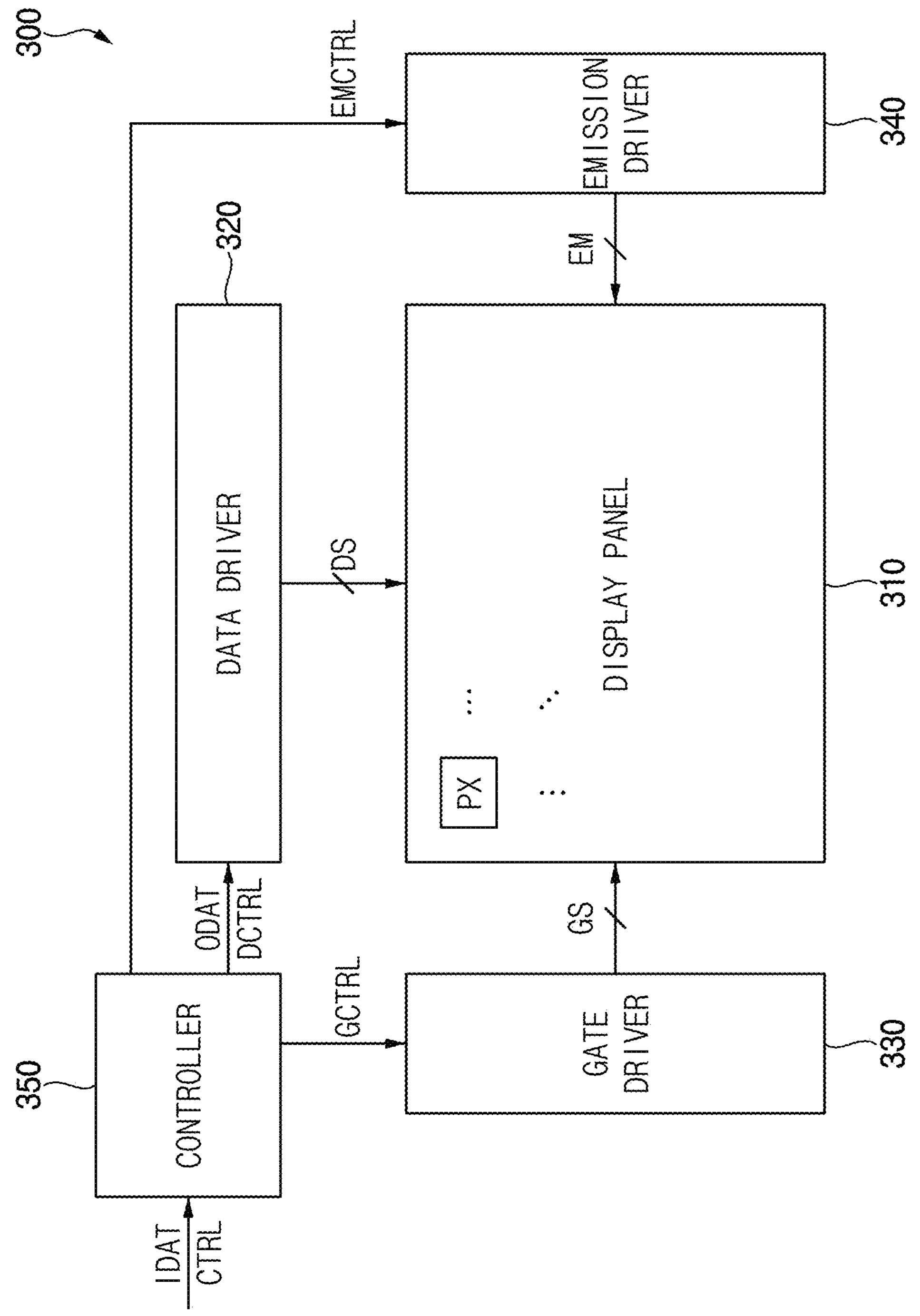
FIG. 6 is a block diagram showing a display device according to an embodiment.

FIG. 6 is a block diagram showing a display device 300 according to an embodiment.

Referring to FIG. 6, a display device 300 may include a display panel 310, a data driver 320, a gate driver 330, an emission driver 340, and a controller 350. The display panel 310 may include a plurality of pixels PX. The data driver 320 may provide data signals DS to the pixels PX. The gate driver 330 may provide gate signals GS to the pixels PX. The emission driver 340 may provide emission signals EM to the pixels PX. The controller 350 may control the data driver 320, the gate driver 330, and the emission driver 340.

The data driver 320 may generate the data signals DS based on output image data ODAT and a data control signal DCTRL received from the controller 350. According to an embodiment, the data control signal DCTRL may include an output data enable signal, a horizontal start signal, a load signal, and the like.

The gate driver 330 may generate the gate signals GS based on a gate control signal GCTRL received from the controller 350. According to an embodiment, the gate control signal GCTRL may include a gate start signal, a first clock signal (G_CLK1 of FIG. 5), a second clock signal (G_CLK2 of FIG. 5), and the like.

The emission driver 340 may generate the emission signals EM based on an emission control signal EMCTRL received from the controller 350. According to an embodiment, the emission control signal EMCTRL may include an emission start signal, a first clock signal (EM_CLK1 of FIG. 1), a second clock signal (EM_CLK2 of FIG. 1), and the like.

The controller 350 may receive input image data IDAT and a control signal CTRL from an external host. According to an embodiment, the control signal CTRL may include a vertical synchronization signal, a horizontal synchronization signal, an input data enable signal, a master clock signal, and the like. The controller 350 may generate the output image data ODAT, the data control signal DCTRL, the gate control signal GCTRL, and the emission control signal EMCTRL based on the input image data IDAT and the control signal CTRL.

Figure 7:
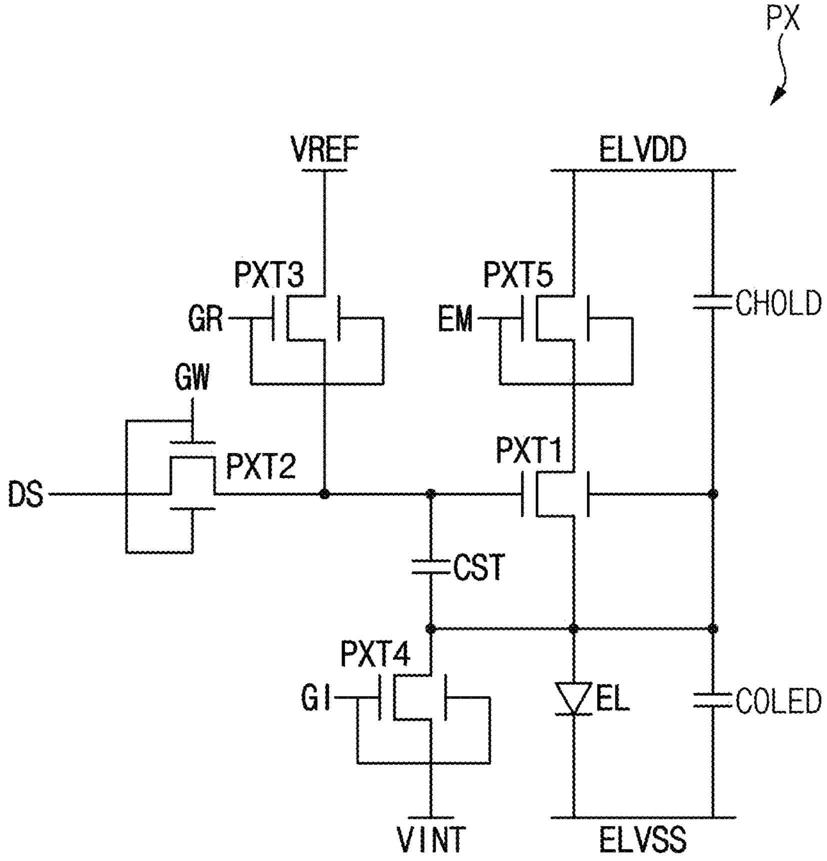
FIG. 7 is a circuit diagram showing a pixel included in the display device of FIG. 6.

FIG. 7 is a circuit diagram showing a pixel PX included in the display device 300 of FIG. 6.

Referring to FIG. 7, the pixel PX may include a first transistor PXT1, a second transistor PXT2, a third transistor PXT3, a fourth transistor PXT4, a fifth transistor PXT5, a storage capacitor CST, a hold capacitor CHOLD, a diode capacitor COLED, and an organic light emitting diode EL. The gate signal (GS of FIG. 6) may be at least one of a reset gate signal GR, an initialization gate signal GI, and a write gate signal GW.

The third transistor PXT3 may transmit a reference voltage VREF to a gate electrode of the first transistor PXT1 and a first electrode of the storage capacitor CST in response to the reset gate signal GR. The fourth transistor PXT4 may transmit an initialization voltage VINT to a second electrode of the storage capacitor CST, an anode of the organic light emitting diode EL, a second electrode of the hold capacitor CHOLD, and a first electrode of the diode capacitor COLED in response to the initialization gate signal GI. The second transistor PXT2 may transmit the data signal DS to the first electrode of the storage capacitor CST in response to the write gate signal GW, and the storage capacitor CST may store the data signal DS together with the hold capacitor CHOLD and the diode capacitor COLED. The first transistor PXT1 may generate a driving current based on the data signal DS stored in the storage capacitor CST. The fifth transistor PXT5 may form a path for the driving current from a first power line configured to transmit a first power voltage ELVDD to a second power line configured to transmit a second power voltage ELVSS in response to the emission signal EM. The organic light emitting diode EL may emit a light based on the driving current. The hold capacitor CHOLD may include a first electrode connected to the first power line, and a second electrode connected to a source electrode of the first transistor PXT1. The diode capacitor COLED may include a first electrode connected to the source electrode of the first transistor PXT1 and the second electrode of the hold capacitor CHOLD, and a second electrode connected to the second power line. According to an embodiment, the diode capacitor COLED may be a parasitic capacitor of the organic light emitting diode EL.

According to an embodiment, the first transistor PXT1, the second transistor PXT2, the third transistor PXT3, the fourth transistor PXT4, and the fifth transistor PXT5 may be N-type transistors (e.g., NMOS transistors) or oxide transistors. According to an embodiment, each of the second transistor PXT2, the third transistor PXT3, the fourth transistor PXT4, and the fifth transistor PXT5 may further include a back gate electrode connected to a gate electrode thereof. According to an embodiment, the first transistor PXT1 may further include a back gate electrode connected to the second electrode of the hold capacitor CHOLD.

Figure 8:
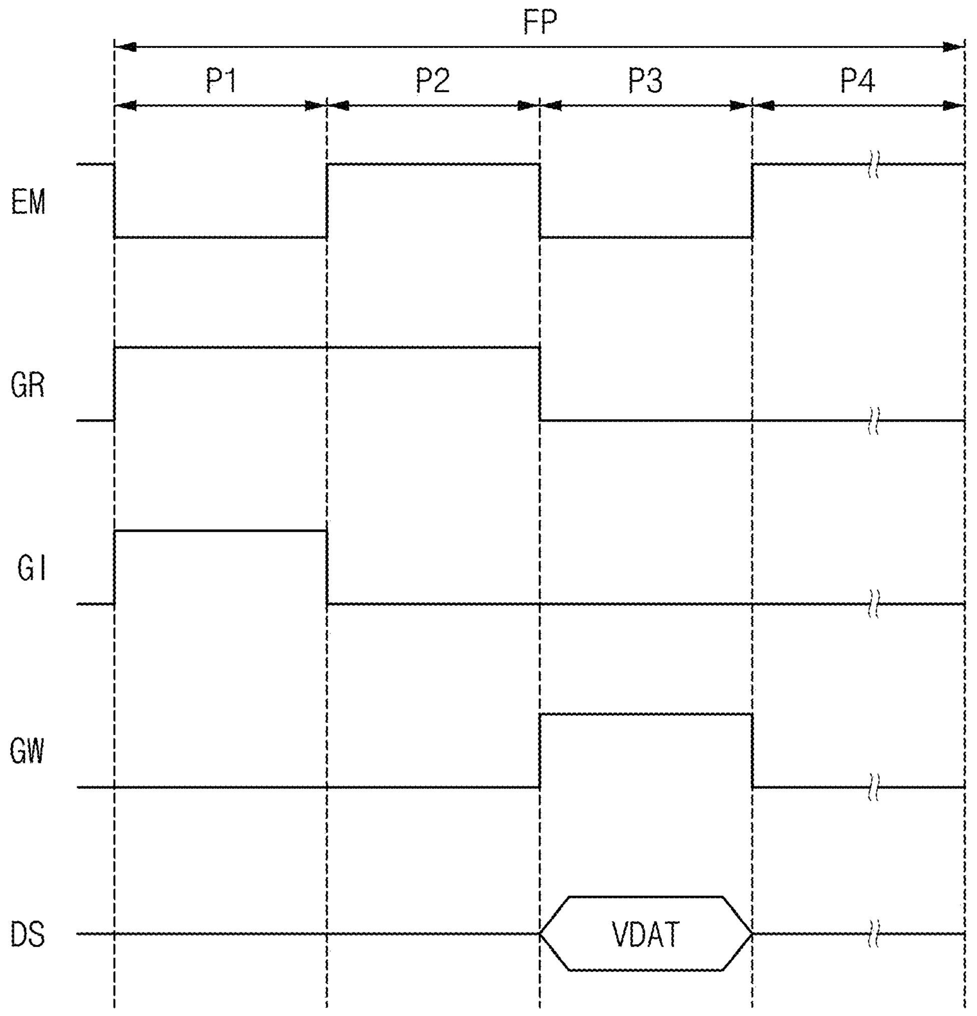
FIG. 8 is a timing diagram for describing an operation of the pixel of FIG. 7.

FIG. 8 is a timing diagram for describing an operation of the pixel PX of FIG. 7.

Referring to FIGS. 7 and 8, a frame period FP may include a first period P1, a second period P2, a third period P3, and a fourth period P4.

In the first period P1, the emission signal EM may have a low level voltage, and each of the reset gate signal GR and the initialization gate signal GI may have a high level voltage. The reference voltage VREF may be applied to the first electrode of the storage capacitor CST and the gate electrode of the first transistor PXT1, and the initialization voltage VINT may be applied to the second electrode of the storage capacitor CST, the source electrode of the first transistor PXT1, the second electrode of the hold capacitor CHOLD, and the first electrode of the diode capacitor COLED. Accordingly, the storage capacitor CST, the hold capacitor CHOLD, the diode capacitor COLED, and the first transistor PXT1 may be initialized.

In the second period P2, each of the emission signal EM and the reset gate signal GR may have a high level voltage, and the initialization gate signal GI may have a low level voltage. The first and fifth transistors PXT1 and PXT5 may be turned on, and a voltage obtained by subtracting a threshold voltage of the first transistor PXT1 from the reference voltage VREF may be stored in the source electrode of the first transistor PXT1 (i.e., the second electrode of the storage capacitor CST). Accordingly, the threshold voltage of the first transistor PXT1 may be compensated for.

In the third period P3, each of the emission signal EM, the reset gate signal GR, and the initialization gate signal GI may have a low level voltage, the write gate signal GW may have a high level voltage, and a data voltage VDAT may be applied as the data signal DS. The data voltage VDAT may be applied to the first electrode of the storage capacitor CST, and the storage capacitor CST may store the data voltage VDAT together with the hold capacitor CHOLD and the diode capacitor COLED.

In the fourth period P4, each of the reset gate signal GR, the initialization gate signal GI, and the write gate signal GW may have a low level voltage, and the emission signal EM may have the high level voltage. The first transistor PXT1 may generate the driving current based on the data voltage VDAT stored in the storage capacitor CST, the fifth transistor PXT5 may be turned on in response to the emission signal EM, and the organic light emitting diode EL may emit the light based on the driving current.

Figure 9:
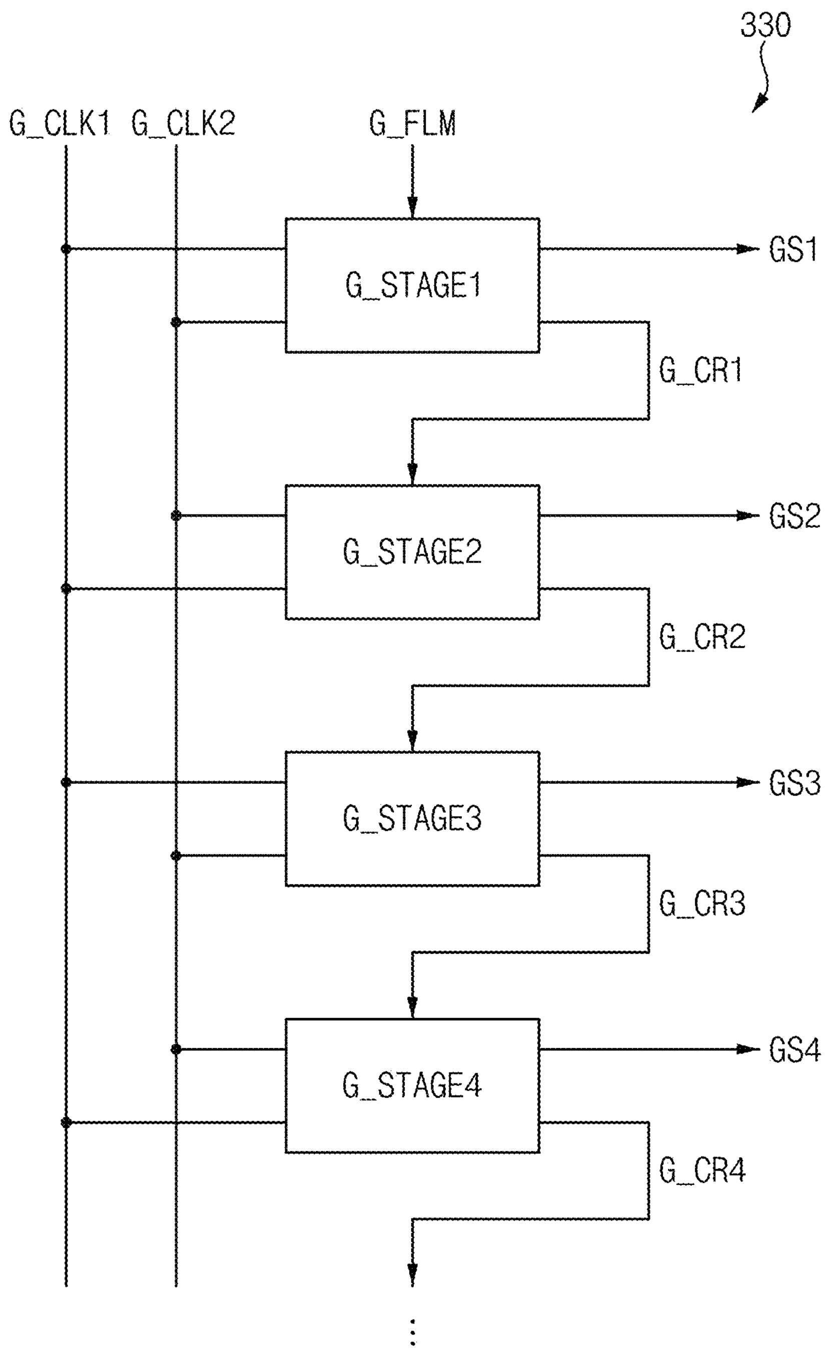
FIG. 9 is a block diagram showing a gate driver included in the display device of FIG. 6.

FIG. 9 is a block diagram showing a gate driver 330 included in the display device 300 of FIG. 6.

Referring to FIG. 9, the gate driver 330 may include a plurality of gate stages G_STAGE1, G_STAGE2, G_STAGE3, G_STAGE4, . . . configured to receive a first clock signal G_CLK1 and a second clock signal G_CLK2, and output a plurality of gate signals GS1, GS2, GS3, GS4, . . . and a plurality of gate carry signals G_CR1, G_CR2, G_CR3, G_CR4, . . . . A first gate stage G_STAGE1 may receive a gate start signal G_FLM as an input signal, and subsequent gate stages G_STAGE2, G_STAGE3, G_STAGE4, . . . may receive gate carry signals G_CR1, G_CR2, G_CR3, G_CR4, . . . of previous gate stages as input signals, respectively.

Each of the gate stages G_STAGE1, G_STAGE2, G_STAGE3, G_STAGE4, . . . may have substantially the same structure as the gate stage 200 shown in FIG. 5.

Figure 10:
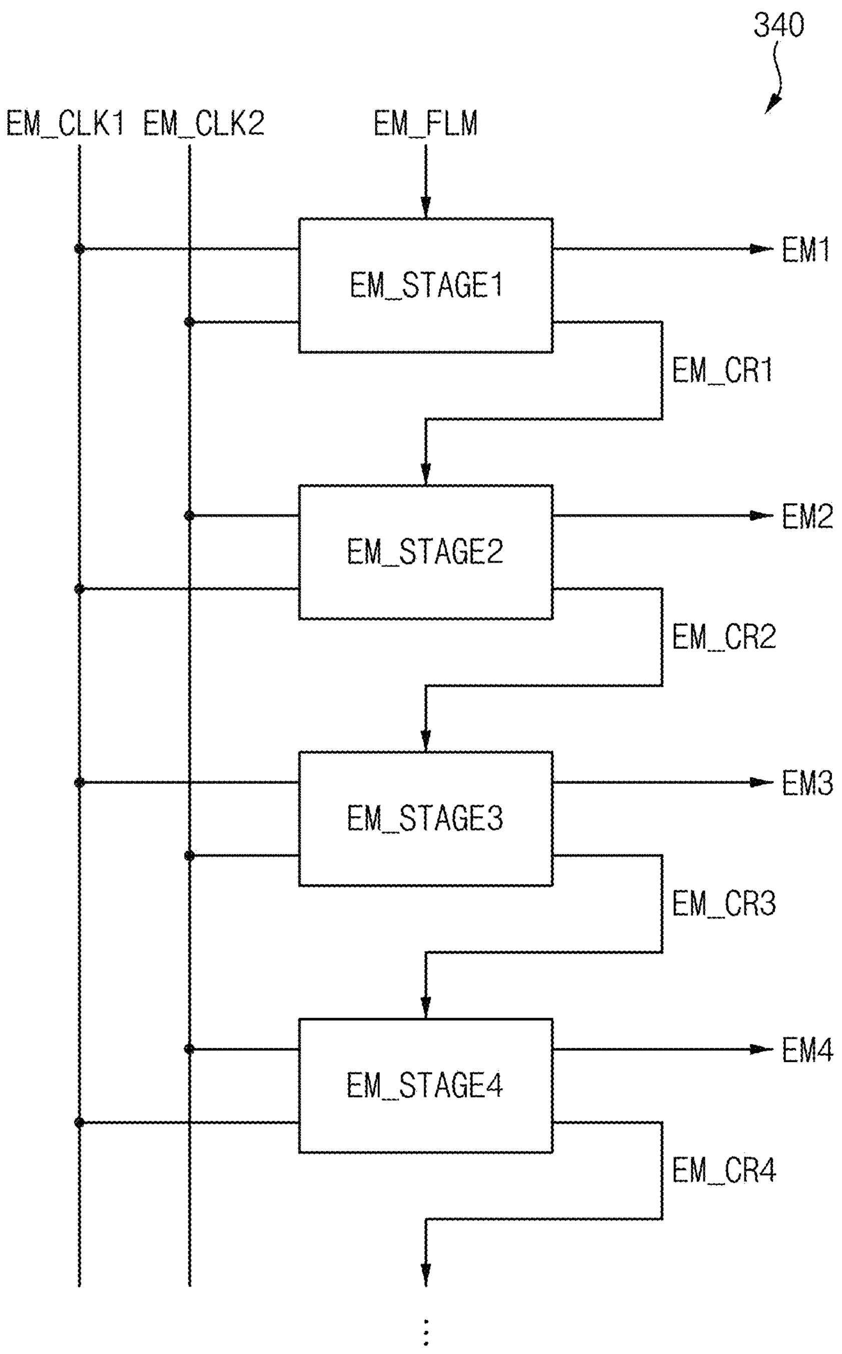
FIG. 10 is a block diagram showing an emission driver included in the display device of FIG. 6.

FIG. 10 is a block diagram showing an emission driver 340 included in the display device 300 of FIG. 6.

Referring to FIG. 10, the emission driver 340 may include a plurality of emission stages EM_STAGE1, EM_STAGE2, EM_STAGE3, EM_STAGE4, . . . configured to receive a first clock signal EM_CLK1 and a second clock signal EM_CLK2, and output a plurality of emission signals EM1, EM2, EM3, EM4, . . . and a plurality of emission carry signals EM_CR1, EM_CR2, EM_CR3, EM_CR4, . . . . A first emission stage EM_STAGE1 may receive an emission start signal EM FLM as an input signal, and subsequent emission stages EM_STAGE2, EM_STAGE3, EM_STAGE4, . . . may receive emission carry signals EM_CR1, EM_CR2, EM_CR3, EM_CR4, . . . of previous emission stages as input signals, respectively.

Each of the emission stages EM_STAGE1, EM_STAGE2, EM_STAGE3, EM_STAGE4, . . . may have substantially the same structure as the emission stage 100 shown in FIG. 1.

Figure 11:
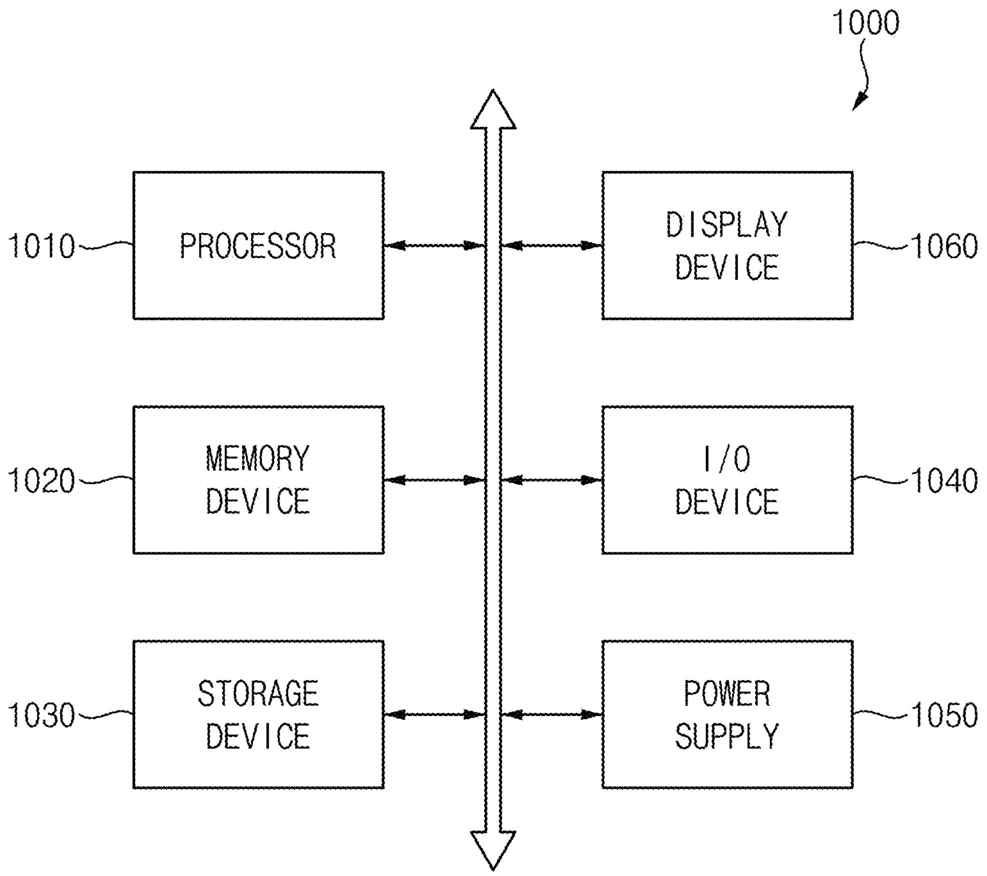
FIG. 11 is a block diagram showing an electronic device according to an embodiment.

FIG. 11 is a block diagram showing an electronic device 1000 according to an embodiment.

Referring to FIG. 11, an electronic device 1000 may include a processor 1010, a memory device 1020, a storage device 1030, an input/output (I/O) device 1040, a power supply 1050, and a display device 1060. The display device 1060 may correspond to the display device 300 of FIG. 6. The electronic device 1000 may further include a plurality of ports capable of communicating with a video card, a sound card, a memory card, a USB device, and the like, or communicating with other systems.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, and the like. According to an embodiment, the processor 1010 may also be coupled to an expansion bus such as a peripheral component interconnect (PCI) bus. According to an embodiment, the processor 1010 may provide input image data (IDAT of FIG. 6) and a control signal (CTRL of FIG. 6) to the display device 1060.

The memory device 1020 may store data required for an operation of the electronic device 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include: an input device such as a keyboard, a keypad, a touch pad, a touch screen, or a mouse; and an output device such as a speaker or a printer. The power supply 1050 may supply a power required for the operation of the electronic device 1000. The display device 1060 may be connected to other components through the buses or other communication links.

A boosting circuit of each of emission stages of an emission driver included in the display device 1060 or a boosting circuit of each of gate stages of a gate driver or both included in the display device 1060 may include a transistor having a gate electrode configured to receive a clock signal, so that a load applied to the clock signal may be reduced, and power consumption of the emission driver or the gate driver or both may be reduced. Accordingly, power consumption of the display device 1060 may be reduced.

The display device according to the embodiments may be applied to a display device included in a computer, a notebook, a mobile phone, a smart phone, a smart pad, a smart watch, a PMP, a PDA, an MP3 player, or the like.

Although the emission drivers, the gate drivers, and the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. An emission driver comprising a plurality of emission stages, wherein each of the emission stages includes:

an input circuit configured to transmit an input signal to a control node;

an inversion control circuit configured to control a voltage of an inversion control node based on a voltage of the control node;

an emission output circuit configured to output a high gate voltage as an emission signal in response to the voltage of the control node, and output a first low gate voltage as the emission signal in response to the voltage of the inversion control node;

a carry output circuit configured to output the high gate voltage as an emission carry signal in response to the voltage of the control node, and output a second low gate voltage that is less than the first low gate voltage as the emission carry signal in response to the voltage of the inversion control node; and a boosting circuit configured to boost the voltage of the control node, and the boosting circuit includes:

a fifth transistor including a gate electrode connected to the control node, a first electrode, and a second electrode;

a 17th transistor including a gate electrode configured to receive a first clock signal, a first electrode configured to receive the second low gate voltage, and a second electrode connected to the first electrode of the fifth transistor;

an 18th transistor including a gate electrode configured to receive a second clock signal having a phase that is different from a phase of the first clock signal, a first electrode configured to receive the high gate voltage, and a second electrode connected to the first electrode of the fifth transistor; and a first capacitor including a first electrode connected to the control node, and a second electrode connected to the second electrode of the fifth transistor.

2. The emission driver of claim 1, wherein each of the first clock signal and the second clock signal has alternating high and low level voltages, and a difference between the high level voltage and the low level voltage is less than a difference between the high gate voltage and the second low gate voltage.

3. The emission driver of claim 2, wherein the high level voltage is less than the high gate voltage.

4. The emission driver of claim 1, wherein all transistors included in each of the emission stages are N-type transistors.

5. The emission driver of claim 1, wherein the input circuit includes a first transistor including a gate electrode configured to receive the first clock signal, a first electrode configured to receive the input signal, and a second electrode connected to the control node.

6. The emission driver of claim 1, wherein the inversion control circuit includes a fourth transistor including a gate electrode connected to the control node, a first electrode configured to receive the second low gate voltage, and a second electrode connected to the inversion control node.

7. The emission driver of claim 6, wherein the inversion control circuit further includes:

a seventh transistor including a gate electrode configured to receive the first clock signal, a first electrode configured to receive the high gate voltage, and a second electrode;

an eighth transistor including a gate electrode connected to the control node, a first electrode configured to receive the first clock signal, and a second electrode connected to the second electrode of the seventh transistor;

a ninth transistor including a gate electrode configured to receive the high gate voltage, a first electrode connected to the second electrode of the seventh transistor, and a second electrode;

a 10th transistor including a gate electrode connected to the second electrode of the ninth transistor, a first electrode configured to receive the second clock signal, and a second electrode;

an 11th transistor including a gate electrode connected to the second electrode of the 10th transistor, a first electrode configured to receive the high gate voltage, and a second electrode connected to the inversion control node; and a third capacitor including a first electrode connected to the gate electrode of the 10th transistor, and a second electrode connected to the gate electrode of the 11th transistor.

8. The emission driver of claim 1, wherein the emission output circuit includes:

a 12th transistor including a gate electrode connected to the control node, a first electrode configured to receive the high gate voltage, and a second electrode connected to an emission output node through which the emission signal is output;

a 14th transistor including a gate electrode connected to the inversion control node, a first electrode configured to receive the first low gate voltage, and a second electrode connected to the emission output node;

a fourth capacitor including a first electrode connected to the control node, and a second electrode connected to the emission output node; and a fifth capacitor including a first electrode connected to the inversion control node, and a second electrode configured to receive the first low gate voltage.

9. The emission driver of claim 1, wherein the carry output circuit includes:

a sixth transistor including a gate electrode connected to the control node, a first electrode configured to receive the high gate voltage, and a second electrode connected to a carry output node through which the emission carry signal is output; and a 13th transistor including a gate electrode connected to the inversion control node, a first electrode configured to receive the second low gate voltage, and a second electrode connected to the carry output node.

10. The emission driver of claim 1, wherein each of the emission stages further includes a control circuit configured to control the voltage of the control node based on the voltage of the inversion control node.

11. The emission driver of claim 10, wherein the control circuit includes a second transistor including a gate electrode connected to the inversion control node, a first electrode configured to receive the second low gate voltage, and a second electrode connected to the control node.

12. The emission driver of claim 1, wherein the control node is divided into a first control node and a second control node, and each of the emission stages further includes a third transistor including a gate electrode configured to receive the high gate voltage, a first electrode connected to the first control node, and a second electrode connected to the second control node.

13. The emission driver of claim 1, wherein each of the emission stages further includes a 16th transistor including a gate electrode configured to receive a reset signal, a first electrode configured to receive the first low gate voltage, and a second electrode connected to the control node.

14. A gate driver comprising a plurality of gate stages, wherein each of the gate stages includes:

an input circuit configured to transmit an input signal to a control node;

a first inversion control circuit configured to control a voltage of a first inversion control node based on a voltage of the control node;

a second inversion control circuit configured to control a voltage of a second inversion control node based on the voltage of the control node;

a gate output circuit configured to output a high gate voltage as a gate signal in response to the voltage of the control node, and output a first low gate voltage as the gate signal in response to the voltage of the first inversion control node or the voltage of the second inversion control node;

a carry output circuit configured to output the high gate voltage as a gate carry signal in response to the voltage of the control node, and output a second low gate voltage that is less than the first low gate voltage as the gate carry signal in response to the voltage of the first inversion control node or the voltage of the second inversion control node; and a boosting circuit configured to boost the voltage of the control node, and the boosting circuit includes:

a fifth transistor including a gate electrode connected to the control node, a first electrode, and a second electrode;

a 24th transistor including a gate electrode configured to receive a first clock signal, a first electrode configured to receive the second low gate voltage, and a second electrode connected to the first electrode of the fifth transistor;

a 25th transistor including a gate electrode configured to receive a second clock signal having a phase that is different from a phase of the first clock signal, a first electrode configured to receive the high gate voltage, and a second electrode connected to the first electrode of the fifth transistor; and a first capacitor including a first electrode connected to the control node, and a second electrode connected to the second electrode of the fifth transistor.

15. The gate driver of claim 14, wherein each of the first clock signal and the second clock signal has alternating high and low level voltages, and a difference between the high level voltage and the low level voltage is less than a difference between the high gate voltage and the second low gate voltage.

16. The gate driver of claim 15, wherein the high level voltage is less than the high gate voltage.

17. The gate driver of claim 14, wherein all transistors included in each of the gate stages are N-type transistors.

18. The gate driver of claim 14, wherein each of the gate stages further includes a control circuit configured to control the voltage of the control node based on the voltage of the first inversion control node or the voltage of the second inversion control node.

19. A display device comprising:

a display panel including a plurality of pixels;

a data driver configured to provide data signals to the pixels;

a gate driver including a plurality of gate stages configured to provide gate signals to the pixels;

an emission driver including a plurality of emission stages configured to provide emission signals to the pixels; and a controller configured to control the data driver, the gate driver, and the emission driver, wherein each of the emission stages includes:

an input circuit configured to transmit an input signal to a control node;

an inversion control circuit configured to control a voltage of an inversion control node based on a voltage of the control node;

an emission output circuit configured to output a high gate voltage as an emission signal in response to the voltage of the control node, and output a first low gate voltage as the emission signal in response to the voltage of the inversion control node;

a carry output circuit configured to output the high gate voltage as an emission carry signal in response to the voltage of the control node, and output a second low gate voltage that is less than the first low gate voltage as the emission carry signal in response to the voltage of the inversion control node; and a boosting circuit configured to boost the voltage of the control node, and the boosting circuit of each of the emission stages includes:

a fifth transistor including a gate electrode connected to the control node, a first electrode, and a second electrode;

a 17th transistor including a gate electrode configured to receive a first clock signal, a first electrode configured to receive the second low gate voltage, and a second electrode connected to the first electrode of the fifth transistor;

an 18th transistor including a gate electrode configured to receive a second clock signal having a phase that is different from a phase of the first clock signal, a first electrode configured to receive the high gate voltage, and a second electrode connected to the first electrode of the fifth transistor; and a first capacitor including a first electrode connected to the control node, and a second electrode connected to the second electrode of the fifth transistor.

20. The display device of claim 19, wherein each of the gate stages includes:

an input circuit configured to transmit an input signal to a control node;

a first inversion control circuit configured to control a voltage of a first inversion control node based on a voltage of the control node;

a second inversion control circuit configured to control a voltage of a second inversion control node based on the voltage of the control node;

a gate output circuit configured to output the high gate voltage as a gate signal in response to the voltage of the control node, and output the first low gate voltage as the gate signal in response to the voltage of the first inversion control node or the voltage of the second inversion control node;

a carry output circuit configured to output the high gate voltage as a gate carry signal in response to the voltage of the control node, and output the second low gate voltage as the gate carry signal in response to the voltage of the first inversion control node or the voltage of the second inversion control node; and a boosting circuit configured to boost the voltage of the control node, and the boosting circuit of each of the gate stages includes:

a fifth transistor including a gate electrode connected to the control node, a first electrode, and a second electrode;

a 24th transistor including a gate electrode configured to receive the first clock signal, a first electrode configured to receive the second low gate voltage, and a second electrode connected to the first electrode of the fifth transistor;

a 25th transistor including a gate electrode configured to receive the second clock signal, a first electrode configured to receive the high gate voltage, and a second electrode connected to the first electrode of the fifth transistor; and a first capacitor including a first electrode connected to the control node, and a second electrode connected to the second electrode of the fifth transistor.

* * * * *